June 18, 1946.   A. M. MARKS   2,402,176
POLARIZED ILLUMINATION
Filed Nov. 16, 1938   8 Sheets-Sheet 4

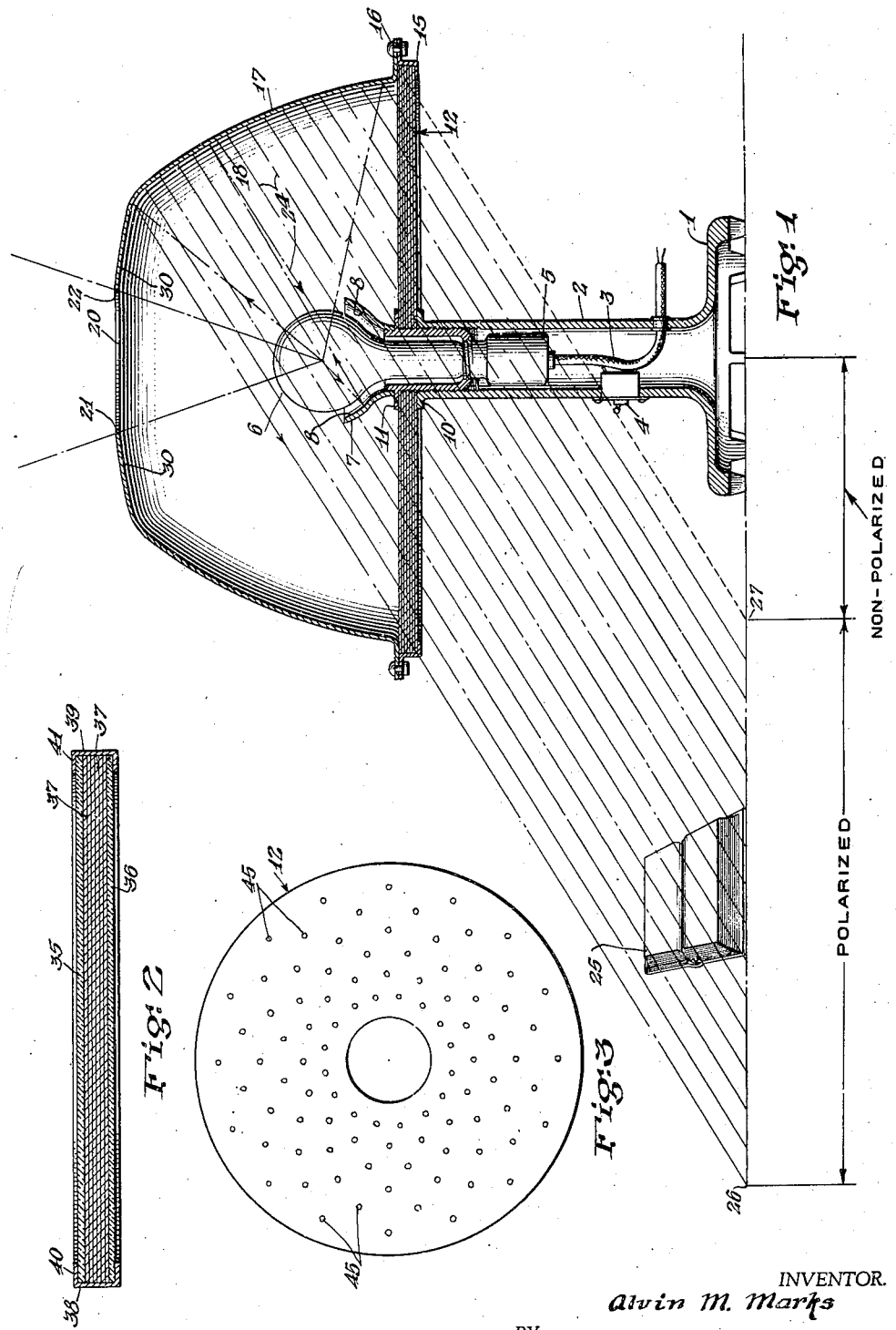

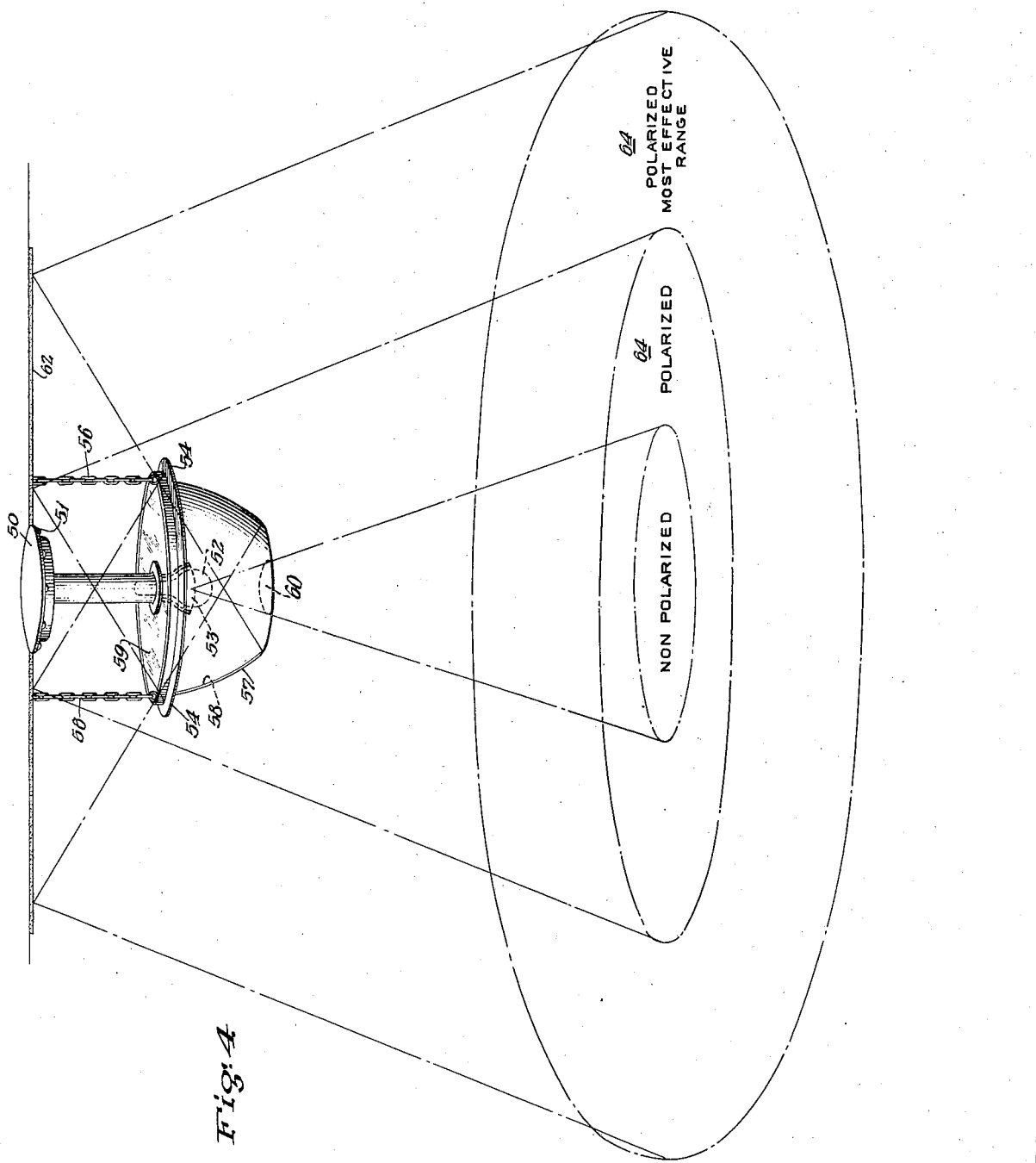

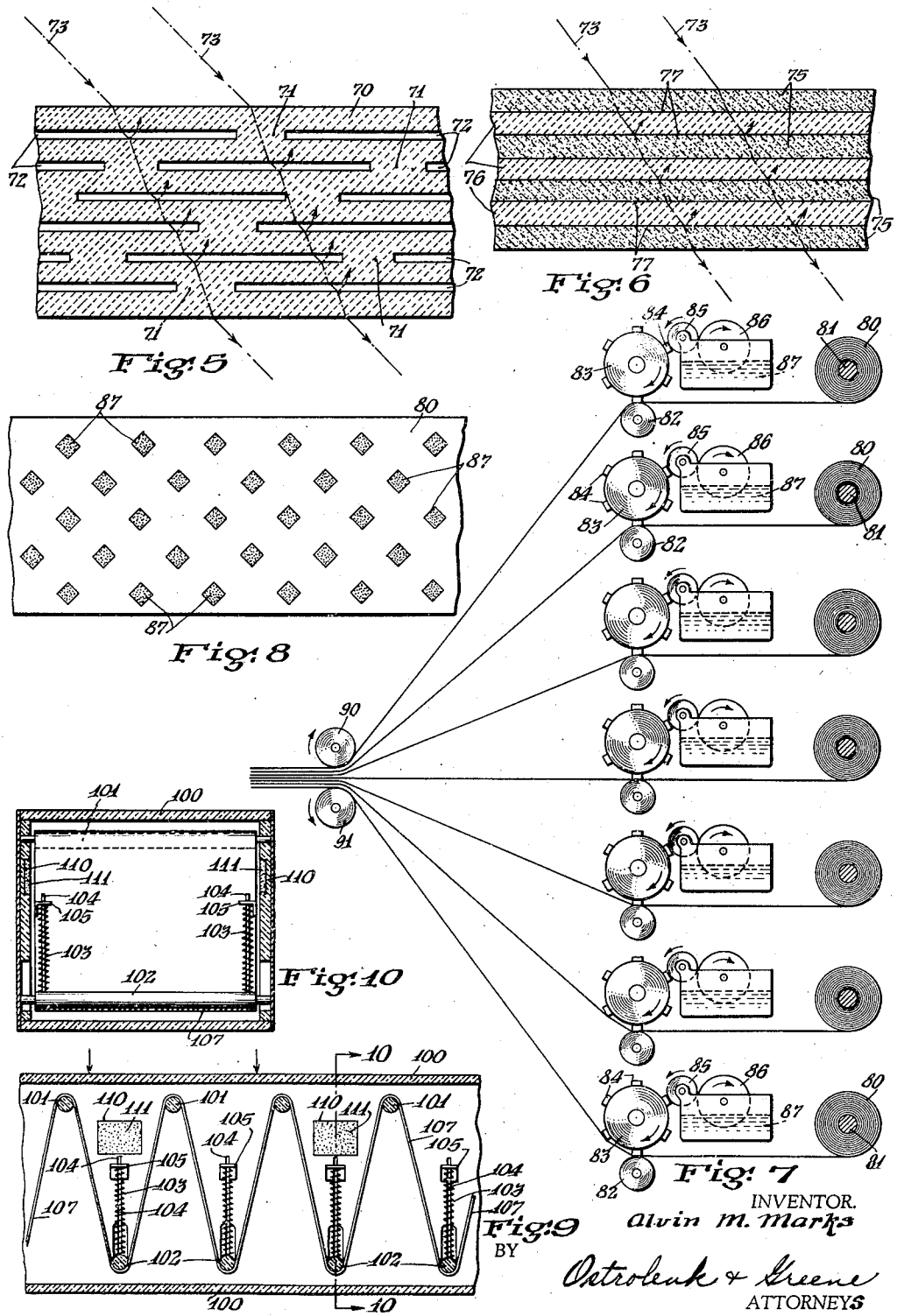

INVENTOR.
Alvin M. Marks
BY Ostrolenk & Greene
ATTORNEYS

June 18, 1946.  A. M. MARKS  2,402,176
POLARIZED ILLUMINATION
Filed Nov. 16, 1938  8 Sheets-Sheet 5

INVENTOR.
Alvin M. Marks
BY
Ostrolenk & Greene
ATTORNEYS

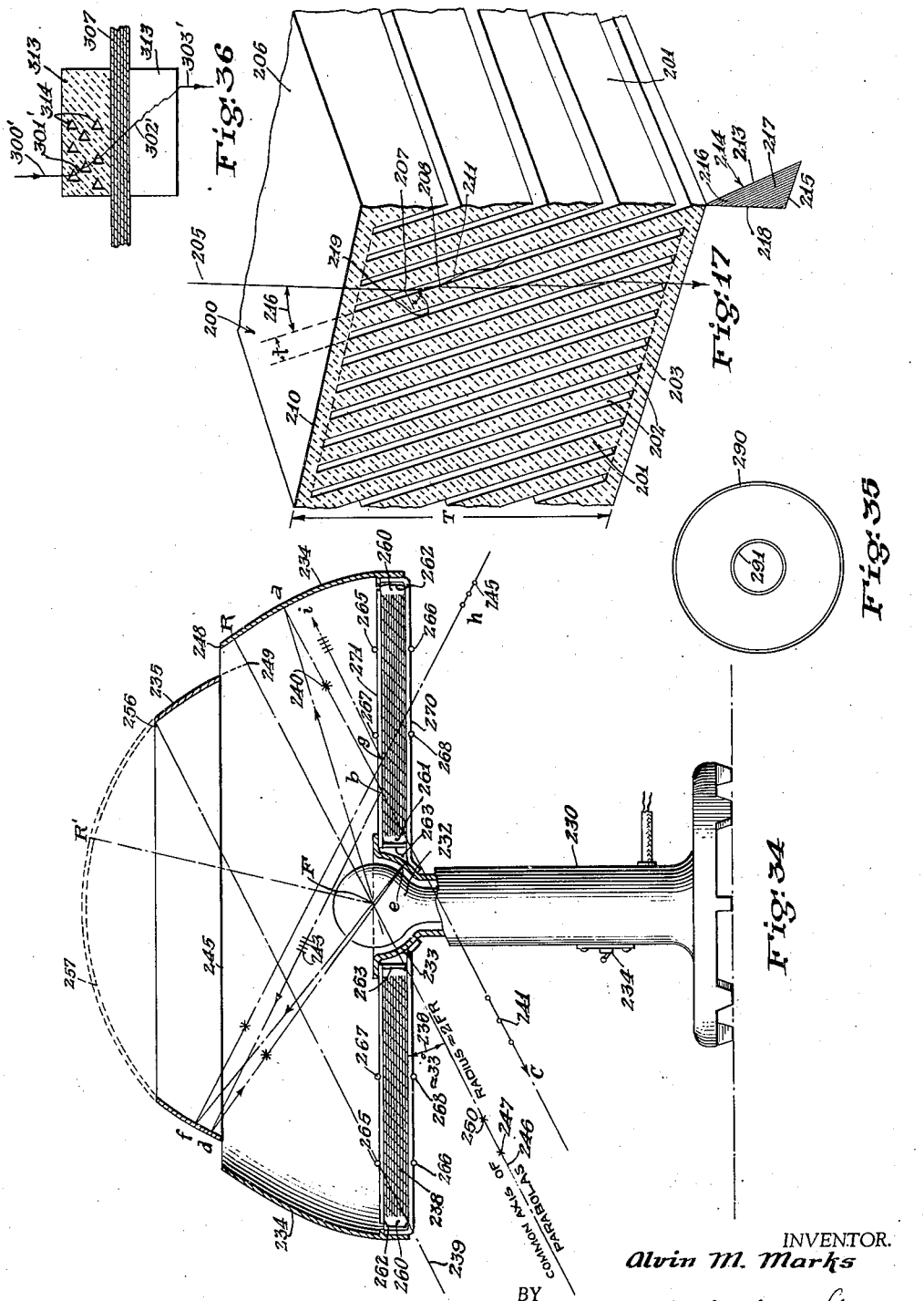

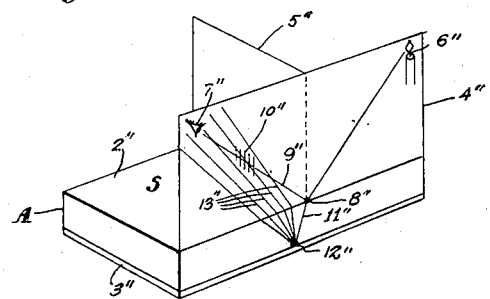
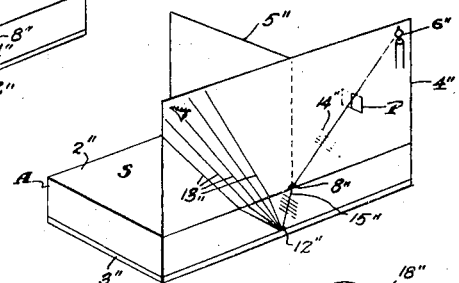
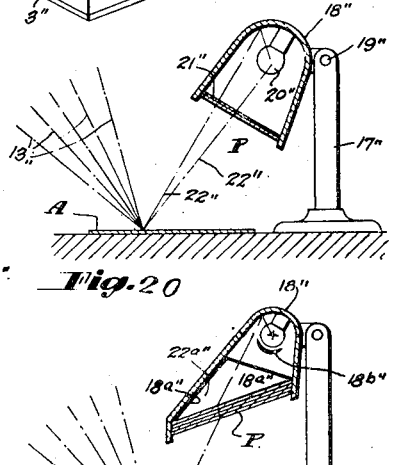
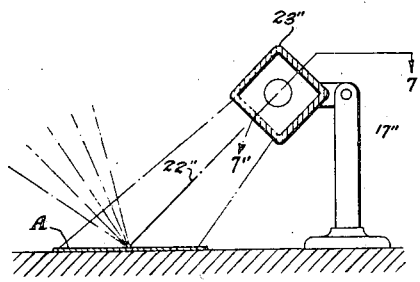
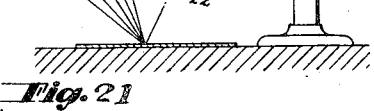
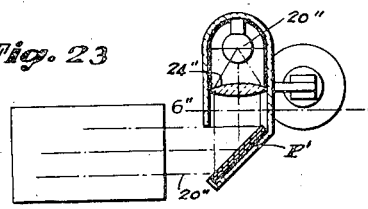

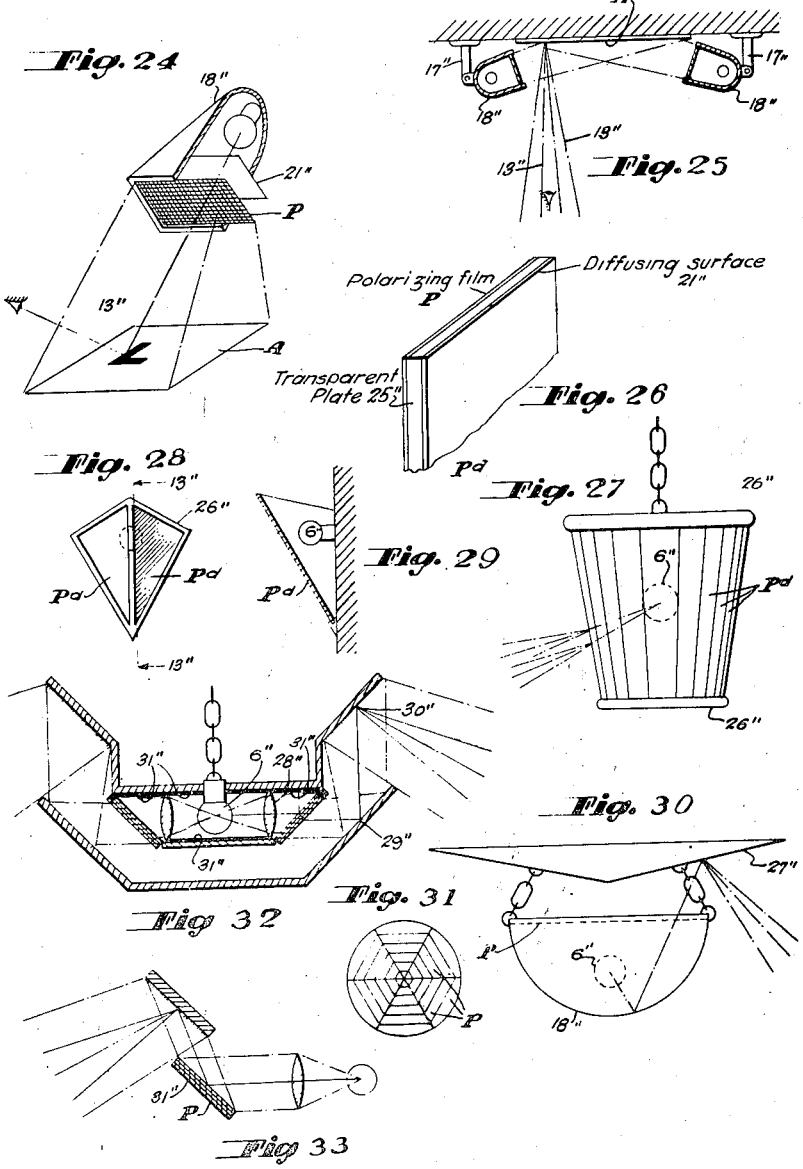

UNITED STATES PATENT OFFICE 2,402,176

POLARIZED ILLUMINATION

Alvin M. Marks, Whitestone, Long Island, N. Y.

Application November 16, 1938, Serial No. 240,608

14 Claims. (Cl. 88—65)

My invention relates to the illumination of surfaces and is directed more particularly to the modification of light impinging on or reflected from surfaces in such manner as to eliminate or minimize glare when said surfaces are viewed by the human eye or by photography or television.

My invention further relates to illuminating means adapted to transmit polarized light, and more specifically my invention relates to a lighting fixture so constructed that it transmits polarized light and non-polarized light.

My invention further relates to a sheet polarizer and to various methods of producing the same, and to various modified forms of such sheet polarizers.

First with regard to the illumination of surfaces:

It is well recognized that, when a surface is seen by reflected light and particularly when the source of light is positioned at the opposite side of the object viewed on said surface, the reflected light impinging upon the eye will ordinarily result in more or less glare depending upon several factors, among which may be mentioned the light absorbing qualities of the surface, the character of said surface, the position of the source of light with reference to the surface and the eye, and the intensity of such light. In everyday life, these phenomena manifest themselves, for example, when a person is reading a book with the light positioned on the opposite side of the book from the eye and in substantial alignment so that the light impinging on the printed page is reflected directly to the eye. If the book has calendered pages, it is practically impossible to see the print.

Another example is found in the instance where a person seeks to view the grain of wood of a desk through a glass plate superimposed thereupon when the desk is positioned between the observer and a window through which sunlight is streaming upon the desk top. In such instances, the reflected glare is so pronounced as to be almost blinding.

My experimentation and research in connection with these phenomena have led me to certain conclusions on which the present invention is based. I have found that when light is reflected from any insulating surface, the light reflected from the upper molecules of the surface, that is to say the upper layer, is not appreciably affected by the nature of the material. By "insulating surface," I mean the superficial surface of material which is substantially a non-conductor in the electrical sense. This includes metallic or other electrically conductive bodies coated or covered by an insulating film of oil, lacquer or the like. My observations have shown in this connection that when ordinary light strikes, for example, a glass surface, a large proportion of that portion of the beam which is reflected from the plane of the surface or by the surface layer is polarized in a plane normal to the glass surface, while that portion of the light which penetrates the surface is refracted thereby and transmitted to the deeper layers below the surface and there reflected and modified to a great extent by the absorptive properties of the material below the surface layer. If the reflected beam and the refracted beam are at substantially ninety degrees to one another, the reflected beam may be totally polarized in accordance with Brewster's law. At other angles, however, the polarization of the reflected beam is not complete. However, for the angles between say twenty degrees and seventy degrees to the normal to the surface viewed, a substantial fraction of the purely reflected light is plane polarized; that is for all angles at which surfaces are ordinarily viewed, a substantial fraction of plane polarized light comprises the light reflected from the surface. In any event, if it be assumed that the surface viewed is a surface of a desk with a glass plate thereover, an incident beam of ordinary light impinging upon the exposed upper surface of the glass will be broken up into two distinct beams, namely, a reflected beam and a refracted beam. The reflected beam will be substantially polarized in a vertical plane, while the refracted beam will pass through the glass plate and impinge upon the wooden table top which will reflect the said refracted beam through the glass plate to the eye of the observer. As the absorption of the refracted beam by the grain of the wood is in readily distinguishable degrees, the beam reflected from the wood surface will exhibit a marked contrast so that the grain of the wood may be readily seen. There is thus impinging upon the eye this latter contrasting beam and also the beam reflected from the glass surface and substantially polarized in a vertical plane, but inasmuch, in some circumstances, as the vertical plane polarized reflected beam embodies materially greater intensity, the eye reacts more pronouncedly thereto and it is practically impossible to see the contrast in the reflected refracted beam.

It has been heretofore suggested that reflective glare might be minimized through the utilization of so-called "analyzers" in the form of spectacles or binoculars adapted to be worn by the observer or held in his hands in such a manner as to intercept the reflected beam directly before his eyes and after the beam has left the object to be viewed.

I have observed through my researches, however, that if it is possible to substantially eliminate, prior to impingement on the surface, the beam which would be reflected from the glass surface in the example given, that the other beam of contrasting character may be properly and effectually observed without eyestrain and without the use of analyzers. The object of this invention, therefore, in a generic sense is to so modify light transmitted to a surface to be viewed as to substantially eliminate therefrom the glare component of such light and thereby permit contrast in said surface to be clearly observed without an analyzer. This I have found capable of accomplishment by dividing ordinary light into two distinct components of plane polarization at right angles to one another and eliminating therefrom the one plane polarized in a plane normal to the surface viewed and prior to impinging of the light upon said surface. To accomplish this I plane polarize the light prior to permitting the same to impinge upon the surface to be viewed, so that only plane polarized light impinges upon and is reflected from the object to be viewed.

In practically carrying out the invention, I interpose between a source of light and the object to be viewed a polarizing medium which will plane polarize the beam in a plane including a ray in the beam and normal to a plane which passes through said ray and its geometric projection on said surface, so that when the beam impinges upon the object, it will be divested of light in its plane of polarization normal to, and which would ordinarily be reflected by, the surface or surface layer of the object and cause a glare and thus I eliminate the purely reflected beam, while the beam of light in the former plane of polarization is refracted, penetrates the surface layer, and is transmitted to the lower layers and modified to a greater extent by the absorptive properties of the material of such object, and is reflected thereby in a more or less diffused way not conducive to glare, but rather in a manner to give well defined contrast between adjacent areas which differ in absorptive ability. This reflected diffused contrast-carrying beam is substantially unpolarized.

Various apparatus may be employed in carrying out the present invention and in every instance polarization takes place prior to the impingement of the beam on the object. The particular apparatus employed will of course depend upon the type of illumination desired, such, for example, as direct illumination as distinguished from indirect illumination, in for example the art of house lighting.

The invention is directed primarily to apparatus for carrying out the present invention, but it also includes the methods whereby this result is achieved.

With regard to illumination means for illuminating with polarized light:

The problems of providing non-glare lighting and the benefits of such non-glare light have long been recognized. The potential dangers of eye strain and sight difficulties brought about by reading in a glaring light are commonly recognized, and many attempts to provide a scientific light to prevent such eye strain have been made. Commonly, such attempts to overcome these problems have concerned themselves with diffusion of light and with light direction. But further scientific research has revealed that diffused light by no means solves the difficulty of glare and that the true solution for providing a light that will enable reading without strain or tiring effects necessitates the use of polarized light. Polarized light, by its physical nature and particularly when employed as I shall hereinafter set forth, provides an ideal light which illuminates without objectionable reflection and glare.

But to provide polarized light it has been most convenient to employ polarizing means containing either a large single crystal or multiple crystals that act, when properly aligned, to polarize the light directed therethrough. But such polarizing means are relatively expensive, and at present are not being manufactured on a sufficiently large scale for mass production suitable for low cost illumination.

I have conceived of a novel illuminating means whereby I obtain the desirable polarized light at such a range as is suitable for reading and similar purposes and whereby I also obtain non-polarized light in those ranges where polarization of light is not necessary. Further, my novel illuminating means provides indirect lighting effects which are extremely desirable for general illuminating utility.

I have specifically employed a multiplicity of layers of very thin plastic material in such a way as to obtain a polarizer that for the first time makes possible the practical commercial use of the polarizing action of the multiple transparent layers known in the art. This polarizing medium comprising the plurality of layers of thin plastic sheets united in close contact with each other is an important element of my invention.

It is an object of my invention to provide glare-free illumination.

It is another object of my invention to provide a novel non-glare illuminating means by appropriate polarization of the transmitted light.

It is another object of my invention to provide a novel illuminating means that transmits non-glare polarized light in radial directions and unpolarized light in substantially a vertical direction.

It is another object of my invention to provide non-glare illuminating means that transmits only reflected light in radial directions through a polarizing means comprising a series of thin transparent plates.

It is still another object of my invention to provide a novel indirect lighting lamp comprising a light source, means for directing light from this source on to reflecting surfaces, and means for directing that light from the reflecting surfaces through a series of thin transparent plates at an angle of about thirty-three degrees to provide non-glare polarized light.

It is still another object of my invention to provide a novel non-glare illuminating means by means of which reflected light is transmitted through multiple closely aligned transparent plastic plates.

It is a further object of my invention to provide a non-glare light polarizing lamp having a reflector with a depolarizing surface for the purpose of increasing light transmission efficiencies.

It is still a further object of my invention to provide a light polarizing lamp having a clear bulb light source, a reflector below such light source and a reflector of revolution above such light source so as to reflect rays radially through a suitable polarizing medium, thus providing a field of radial non-glare illumination.

It is another object of my invention to produce a non-glare light polarizing lamp having multiple reflectors belonging to the same family of parabolae.

It is still another object of my invention to produce a radial polarizer comprising a multiplicity of very thin transparent sheets.

It is still another object of my invention to produce a polarizer comprising a multiplicity of very thin plastic transparent sheets.

It is a further object of my invention to produce a polarizer comprising from 15 to 30 thin plastic sheets.

It is still a further object of my invention to produce a polarizer comprising from 15 to 30 thin plastic sheets having a thickness of about .00088 inch.

It is still a further object of my invention to produce a polarizer comprising from 15 to 30 thin plastic sheets having a thickness of .0015 inch or less.

It is still a further object of my invention to provide a polarizing unit having a predetermined angular position to effect the polarization of light directed normal to the unit.

It is still a further object of my invention to provide a system of non-glare room illumination adapted to simultaneously direct properly polarized light onto vertical and horizontal surfaces of the room or objects within the room.

It is still a further object of my invention to provide novel forms of multiple plate polarizing units.

It is still a further object of my invention to provide a polarizer having areas of sharply different indices of refraction.

Further objects of my invention will become apparent from the description thereof herein set forth and from a consideration of the drawings.

The thin plastic sheets which comprise the polarizer of my invention are preferably on the order of .0015 inch or less although they may run as thick as .004 inch. I prefer to use from 15 to 30 of these plastic sheets of the thickness above referred to and to closely contact and suitably join these sheets together to get such permanent interfacial contact for proper polarizing results. By employing thin plastic sheets on the order of .0015" or less, I get the following new and unexpected results.

1. Low absorption of light: Because of the extreme thinness of plastic sheet little light is absorbed or lost during the transmission of the light through the polarizing medium. Inasmuch as the polarizing action of itself theoretically blocks out fifty per cent of the light, it is of great importance that a maximum quantity of light be transmitted through the polarizing medium so as to actually obtain as close as possible to the maximum of fifty per cent of light.

2. Utilization of a multiplicity of thin films as above designated has the further new and novel result of transmitting light without objectionable coloration in its passage: For example in the case of layers of rubber hydrochloride of a thickness greater than that designated here, the use of multiple layers gives a decided yellow tinge to the transmitted light; whereas the employment of very thin films of the above ranges reduces the coloration to a negligible amount.

In this same connection, I have found that when films above the range I employ are used, there is such a scattering of the light within the films as to interfere with clear vision therethrough and cause the blur and diffusion. Again, when a film of the thickness of my range is used, this scattering is reduced to an amount that makes it relatively unnoticeable.

As a further new and novel result of this device, I obtain a reflected beam of unusually high intensity. This is because the extremely thin layers have practically negligible absorption in the passage of light into and out of the polarizing layers. This high intensity reflected beam of light is virtually colorless and very highly polarized. It also is substantially close to fifty per cent of the originally impinging beam.

In contradistinction to this, when thick plates are used, there is considerable absorption of light as it travels into and out of the layers so that the reflected beam is substantially weaker than the reflected beam when very thin layers of the range I specify are used. This is because the path of light when my extremely thin plates are used is infinitesimal compared to the path of the light in the thicker plates such as glass.

3. Fewer strains: By employing the extreme thinness preferably of .0015" or less, the strains which are often set up in plastic material are of such small dimension that the light transmitted therethrough is ordinarily substantially unaffected. That is, if thicker plastic were used, the strains would have a decided influence on the passage of the light through the strain area, but in the extremely thin polarization sheet employed, the strain areas are a negligible factor. These are points of importance because it is to be remembered that because of the large number of such sheets used in combination, namely 15 to 30, if there were such detrimental factors of strain areas or absorption or refraction, the effect would be additively aggregated to be a serious problem in the polarizer.

4. No buckling: By employing plastic sheets of the preferred thickness above set forth, I have solved another practical problem in connection with this polarizer. The polarizer is adapted to be employed in homes, often adjacent to a light source, such as a bulb, which means that there is a large amount of heat developed to which the plastic sheet polarizer is subjected. Because the plastic sheet polarizer is positioned in front of the light source, one side of the polarizer is subjected to a far greater amount of heat than the other side and thus there is substantially greater expansion on that side which is in closest contact with the light and heat source than on the external sheets which are farthest from the light source. This relative expansion of different sheets is important because the sheets are permanently and positively secured to each other so that if the differential expansion between the respective sheets is too great, there will be a rupture of the union or a buckling that would seriously impair, if not destroy, the effective use of the plastic sheet polarizer. I have found that the preferred thickness range above referred to is such that the expansion between the respective sheets is within the range that will prevent any separation between the component sheets and, further, is such that no buckling results under the heat conditions to which the plastic sheet polarizer is subjected.

5. Close and flat contact between the sheets: By employing the plastic sheets of the thickness above referred to, namely .0015" or less, I achieve the optimum condition of close and flat contact between the respective sheets. When thicker sheets are employed I have found that the extremely close contact between the respective sheets is more irregular and more easily disturbed than with the thin sheets which I employ. What I believe to be an important reason for this close contact is that in sheets of the extreme thinness that I employ, there is a certain tendency induced by electrostatic charges, because of which the very thin sheets are attracted to each other and permanently maintained in that close and flat contact.

6. Excellent light polarizing effects and light transmission: A further new result which I obtain by the use of the extremely thin sheets above referred to is that I may use in combination from 15 to 30 sheets without detrimental light loss or light error and this number of sheets, namely 15 to 30, gives practically perfect light polarizing effects and light transmission.

When very thin plastic material, such as cellulose acetate or Pliofilm, is employed, I have found that by stretching the plastic film so that it is permanently held in its position in the lamp in a stretched condition, a higher transmission can be achieved. This applies to other elastic plastic materials. In this stretched condition, buckling due to heat expansion is avoided.

When it is desired to have an air space between the respective layers, I may employ an adhesive which may be in the nature of a thermoplastic adhesive or a thermoadhesive or a material having a plasticizing and adhesive effect upon the respective layers. In order to secure the bond I may also employ alternate layers of thermoadhesive and alternate layers of non-thermoadhesive materials, in the case of the materials having the specified differences in the indexes of refraction.

As an adhesive means for use in joining the respective layers to obtain the proper air spacing between the layers for polarizing effects I may also use preformed intermediate layers of thermoadhesive sheeting, that is preformed layers of thermoadhesive sheeting which are small in area and operate to bond the respective layers one to the other. The thermoadhesive sheeting may be applied from a continuous strip which is cut by suitable cutting means and the cut area applied by a travelling applicator. In this way I may obtain a predetermined spacing between the respective sheets so as to maintain the optimum spacing between the sheets. This preformed thermoadhesive sheet presents certain advantages over the above mentioned methods of bonding by liquid adhesive in that it insures that there will be a minimum of spacing and that it holds this bonded area to a minimum. As will be noted, it is desirable that such bonded area will be held to a minimum inasmuch as the total polarizing effect of the respective bonded plates depends upon the non-bonded areas. Alternately, I may employ as the bonding means a continuous sheet of adhesive material having large stamped out areas so that there remains only small areas to effect the bonding of the respective adjacent plates. The cellular structure thus resulting has the additional advantage of being self-sealed against exterior conditions. The use of these preformed adhesives insures a final polarizing means in which the plastic materials are unaffected by added plasticizer or extraneous deleterious heating effects.

I prefer to effect a seal about the periphery or adjacent the periphery of my composite polarizing plastic layers in order to prevent the entrance between the respective layers of moisture or any deleterious influence which may disturb the desired polarizing effectiveness of the unit. This seal may be effected by simple heat and pressure means when thermoadhesive layers are employed, or a strip of added adhesive or adhesion inducing material may be employed about the periphery, which, together with or without the pressure forms a neat seal. Also it may be advisable to provide suitable sealing compounds to be applied after the said sheeting has been cut to size. This seal may be effected either by an added sealing material or, if the material of the composite plastic films is thermoplastic, the sealing may be effected by simply applying a heating means to obtain a flow to the edges. Further the seal may be effected by the application of a plasticizer to the edges to cause the same flow of materials to obtain the sealing action.

In order to maintain the plastic sheets in desired predetermined position, it is necessary to give them support. Although I have particularly spoken of the supporting means such as glass sheets externally placed with respect to the composite sheets, I may employ externally of these combined plastic sheets one or more supporting members comprising for example, a radially extending strip structure which acts to hold the composite sheets against sagging, or I may employ a supporting screen on the bottom or on the top or both top and bottom of the composite sheets. The screens should be of such construction that they present maximum support and minimum obstruction. When screens are used both on top and bottom, preferably I join the top and bottom screens with joining members such as staples to obtain a permanent rigid engagement between the two and hence form a secure unit. By the term "screen" I mean not only a wire mesh, but I intend to apply this term broadly to any supporting structure that offers surface support.

Another form of support which I may employ comprises integrally laminated with the combined plastic sheets a suitably rigid radially extending strip member. This strip member may be of metal, such as wire, or it may be transparent plastic material of proper shape. Such a reinforcing radial strip may be combined externally with the plates or integral with them according to the method of manufacture desired.

Previously I have discussed the use of a cut out sheet for effecting the separation of the respective composite plastic sheets or layers. Such a cut away preformed sheet affords a certain stiffness or support and when a number of such cut away preformed sheets are employed to join the different layers, the stiffness of these combined preformed cut away sheets may afford sufficient support without external means.

In the event that it be desired to utilize said polarizing screen for polarizing rays directly normal to the plane of the polarizer, the wire mesh support may be bent back and forth to a zig-zag corrugated shape so that the composite polarizing sheets will be held by the support at the proper angle to the impinging beam, i. e. about thirty-three degrees.

In the case of the composite plastic films described in the present application I employ an atmosphere of an inert gas to preserve permanently the properties of the plastic material without deterioration. Further, the pressure of the inert gas tends to prevent the volatilization of any volatile liquids contained within the composite which would have a tendency to reduce polarization effects. In addition to the inert gas I employ a small amount of volatile solvent or plasticizer corresponding to that employed within the plastic structure to effect a vapor pressure on such plastic so as to maintain the contained solvent or plasticizer within the composite structure and prevent its escape.

The polarizing units described herein are intended for utilization not only with regard to artificial light sources but also with regard to natural illumination and may be employed in skylights, windows, or transparent walls or any similar structures for transmitting natural light. The respective sealed polarizing units are also intended for employment in optical devices such as binoculars, telescopes, etc. These sealed polarizing units, especially of the type employing the acid iodo alkaloid compounds contained in the sealed transparent enclosures, are intended for use in optical instruments, and wherever the factor of long life and permanency is essential. They may be particularly employed in such structures where there is sufficient provision for the added space required, and may be of particular advantage on projection devices where intense beams of light tend to cause the rapid deterioration of the polarizing structure.

The description of the drawings follows:

In the drawings, Figure 1 is a cross-section of a lamp adapted to produce polarized light constructed in accordance with my invention, the lamp being positioned on a table with a book within the region of the polarized light thrown off by the lamp.

Figure 2 is a cross-section of a polarizing unit of my invention comprising two external thin plates of glass and multiple layers of plastic material pressed therebetween.

Figure 3 is a plan view of one of the polarizing plates of my invention in the form of a disc with spots or gobs of thermoadhesive on the face thereof to effect its firm adhesion to adjacently positioned thin plastic discs.

Figure 4 is a perspective of a modified form of my invention showing a lamp adapted to be positioned on the ceiling of a room, the polarizing plates being there placed above the light source, the polarized light being thrown on to the ceiling and reflected down into the room.

Figure 5 is a cross section of a polarizing means of my invention comprising multiple layers of plastic material with certain spaces between the layers to produce polarizing effects.

Figure 6 is a cross section of a modified form of a polarizing means in which I employ multiple sharply defined layers of material, alternate layers being of low density and high density material so that each layer represents a marked difference in the index of refraction.

Figure 7 is a diagrammatic view showing the manner in which I apply to a plastic material, adhesive or adhering means in spot staggered relationship.

Figure 8 is a plan view of plastic material showing the spot staggered position of the adhesive upon the plastic.

Figure 9 is a cross section of a polarizing unit of my invention in which I provide a continuous composite plastic polarizing film wound about racks in a predetermined angular relation to produce polarization of light passing through the unit.

Figure 10 is a cross section taken along the line 10—10 of Figure 9.

Figure 17 is a cut-away perspective showing a modified form of polarizing means of my invention comprising an assembly of joined plastic strips properly positioned to polarize light directed normally to the surface thereof.

Figures 18 and 19 are diagrammatic views showing the manner in which light is transmitted to an object according to different principles, Figure 18 showing conventional methods and Figure 19 showing the method according to this invention.

Figures 20, 21 and 22 show apparatus embodying the present invention for carrying out the method illustrated in Figure 19. In these figures an appropriate reflector and associated parts are shown in section.

Figure 23 is a plan section on the line 7″—7″ of Figure 22.

Figure 24 is a perspective section of a structure similar to that shown in Figure 20, but with greater spacing between the polarizing element and a diffusing plate than in the corresponding parts in Figure 20.

Figure 25 shows the manner in which a pair of lamps, such as shown in Figure 20, may be arranged to simultaneously illuminate a picture such, for example, as an oil painting in order to obtain satisfactory illumination of a relatively large surface uniformly.

Figure 26 is a fragmental view of a composite plate which I may employ in carrying out the present invention and which also constitutes part of this invention.

Figure 27 is an elevation showing the present invention as incorporated in a direct lighting system as in the previous views, but showing direct lighting in all radial directions.

Figure 28 is a front elevation of another embodiment of the present invention as incorporated in a direct lighting system.

Figure 29 is a section on the line 13—13 of Figure 12.

Figure 30 illustrates an indirect lighting fixture embodying the present invention in elevation.

Figure 31 is a diagrammatic plan view of the polarizing member used in the structure of Figure 30.

Figure 32 shows diagrammatically another form of indirect lighting fixture in central section.

Figure 33 shows diagrammatically another way in which a light beam may be manipulated in a structure of the general character shown in Figure 16.

Figure 34 is a cross-section of a modified lamp adapted to provide polarized light according to my invention.

Figure 35 is a plan view of the polarizing composite plate assembly in the form of a disk which may be used as the polarizing element in Figure 34.

Figure 36 is a cross-section of a modified form of a composite polarizer in combination with light directing means.

Figure 11:
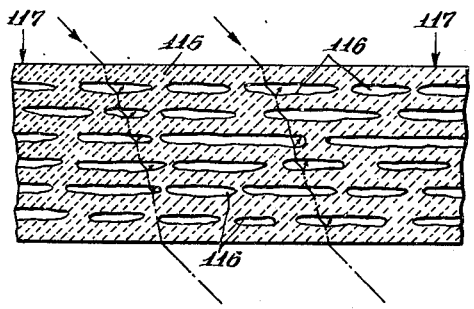
Figure 11 is a cross section of a polarizing means of my invention comprising a plastic material containing a multiplicity of air bubbles which have been flattened down by pressure on the plastic mass.

Referring now more specifically to the drawings, in Figure 1 is shown a lamp base 1 resting on a suitable support. From the base 1 of the lamp there extends a hollow column 2 within which is contained a wire 3 carrying the source of electricity, the control of the electricity being effected by the switch 4. The wire 3 terminates in a socket 5 in which is placed a bulb 6 which is preferably a clear lamp having a suitable wattage. The base of the lamp 6 is surrounded by the shield 7 which effectively blocks any transmission of direct light through the polarizing plates. The inside surface 8 of the shield 7 preferably has a smooth metallic reflecting coating. The column 2 terminates in a flange 10 which cooperates with a similarly above positioned flange 11 to firmly grip the polarizing means.

The polarizing means comprises a series of plates 12, preferably 15 to 30 in number. One of these plates is shown in the plan view of Figure 3. The multiple polarizing plates superimposed one upon the other are of such shape as to conform with the shape of the exterior of the lamp and to intercept completely all light thrown down by the reflectors of the lamp.

As has been shown, these polarizing plates are grasped at their inner edge by the flanges 10 and 11 and they are firmly held at their periphery by the flange 15 secured by the nut and screw arrangement 16 to the reflector shade 17. The reflector shade 17 has preferably an interior depolarizing reflecting surface 18 which somewhat diffusively reflects the light thrown upon it by the clear bulb 6. The shade 17 may be metal, plastic or any suitable material. The reflector shade 17 is so angularly positioned with respect to the polarizing plates 12 that it diffusively reflects the light derived from the bulb light source 6 down through the plates at an angle on the order of thirty-three degrees.

The composite plastic sheet polarizer polarizes every beam of direct or indirect light that passes through it at the proper angle from any point in the lamp enclosure, whereas the conventional polarizer of herapathite crystal or the like maintained in position will not polarize all the light in the proper planes when radially directed rays are used.

At the top of the lamp shade is a cut out section 20 extending from the point 21 to the point 22. Through this cut out section non-polarized light may be directly thrown from the bulb 6 on to the ceiling for general illumination purposes. The lines 24 indicate the rays of light thrown from the reflecting surface 18 down through the multiple transparent plates 12. These rays of light 24 travel through the polarizing plates 22 at an angle of approximately thirty-three degrees and are polarized thereby. The book 25 is thus illuminated by polarized light and the reader thereof is subjected to substantially no glare or eye strain.

The range of polarized light extends from the point 26 to the point 27. The light thrown down directly by the reflecting surfaces 30 at the top of the lamp does not travel through the polarizing means at the proper angle and, therefore, is not polarized, and this range of non-polarized light is shown below the lamp.

Although I particularly set forth the light polarizing effects with respect to one side of the lamp, it is to be understood that these effects are equally applicable with respect to the corresponding range on all sides of the lamp, there being, as indicated, a range of polarized light in the area indicated and a range of non-polarized light directly below the lamp in the area indicated.

I further may provide on this lamp or for use on floor lamps or a desk lamp, means for adjusting the height of the lamp so that I may obtain the optimum angle for the polarization effect. This optimum angle is when the object to be viewed is at a thirty-two degree angle with respect to the light source. I thus provide means for at all times making use of the valuable optimum polarizing effects in lamps carrying these polarizing mediums.

In Figure 2 I show a polarizing means comprising thin glass plates 35 and 36 between which are positioned thin plates or layers of plastic material 37. The plastic plates may be held to each other and between the glass plates by means of the clamps 38 and 39 with the flanges 40 and 41. If desired, only a single glass plate 35 may be employed at the top of the series of plates, and the remaining plates may be of plastic material. Further, only the bottom plate 36 may be of glass with the remaining plates of plastic material.

In Figure 3 I show a means for securing enhanced adhesion between the respective plates. It is essential that these respective plates be closely held one to the other and securely maintained in this position with a definite but minimum space between the faces of the plates. Although this may be effected by the use of clamps alone, I have further found that superior results may be obtained when I additionally spot the plate 12 with added thermoadhesive globules 45. As can be seen the globules 45 are spaced one from the other at suitable intervals over the surface of the plastic polarizing plate 12. When the proper number of plates have been so coated, they are superimposed one upon the other and pressed under heat. The heat activates the thermoadhesive and causes it to flow to firmly secure itself to the adjacently positioned plates. The heat is not such as will impair the physical structure of the plates nor affect their surfaces. The use of this particular combining means for the plates as set forth effects certain new and unexpected results. First, it maintains a permanent spaced positioning of the plates with respect to one another without external clamping means. Secondly, it insures a firm adhesion of the plates one to the other without too great a spacing apart of the plates. That is, the small amount of added thermoadhesive spreads itself so that the adhesive lies in the form of extremely thin spot layers over certain portions of the plate. Thirdly, the adhesion is effected without impairing the optical properties of the plates which affect the polarizing of the light transmitted therethrough. Fourthly, the area covered by the thermo-adhesive is only a small portion of the total surface area of the plate, and, therefore, the polarizing effect of the plates is not blocked by the thermo-adhesive.

In Figure 4, which is a modification of my invention, I show a polarizing lamp in the form of a ceiling fixture. I show a base 50 secured to the ceiling by suitable fixing means 51. In the base 50 there is placed the bulb or light source 52 surrounded by the reflecting shield 53. A rim 54 supported by suitable chains 55 and 56 holds shade 57 with an interior preferably depolarizing reflecting coating 58 which diffusively reflects the light from the light source 52 through the polarizing means 59, which comprises multiple plates of thin plastic material closely superimposed and held one to the other. In the shade 57 is a cut out section 60 through which the light may be directly transmitted from the light source 52 to the room below. Certain of the light from the light source 52 is thrown on to the reflecting surfaces 58 and from them reflected through the polarizing means 59 to the ceiling 62.

When the light travels in the angles indicated by the dotted lines, it provides the range of polarizing light and non-polarized light as described before with reference to the table lamp. The polarized light is reflected by the ceiling 62, which should have a plain or preferably diffusing metallic reflecting surface, to the room below providing areas 64 of polarized light. The angles of the illuminating rays shown are purely schematic and do not necessarily limit the angles which may be employed.

It is to be noted that the important feature of my invention is that in a suitable lamp fixture I direct all light to be polarized from a suitable light source such as a bulb to reflecting members which are so positioned as to reflect the light thrown thereon through a polarizing means comprising a multiplicity of plates of thin plastic material at a critical angle which effects the polarization of the reflected light and provides a desirable range of polarized light at a suitable distance from the lamp. The polarizing means of my invention, in addition to being effective for the purposes set forth, is remarkably inexpensive in comparison with the polarizing means commonly employed at present. Thus, in lieu of providing relatively expensive vehicles for carefully oriented polarizing crystals, I employ about 15 to 30 very thin plates or discs of plastic material closely clamped on to the other and positioned at such an angle with respect to the reflected light as to provide proper polarization of the light. The plates of plastic material may be of a maximum thickness on the order of four-thousandths of an inch. The preferred range is .0015 inch or less. A good thickness is about .00088 inch. I have found that this polarizing means comprising multiple plastic layers reduces the glare three times to 10 times depending on the angle of projection of the beam.

Referring now more specifically to the drawings, in Figure 5 I show multiple layers 70 of suitable plastic material such as a cellulosic derivative, a synthetic resin, rubber, rubber substitutes, rubber halide or rubber hydrohalide derivatives; vinyl acetate; acrylates and methacrylate, such as methyl methacrylate; cellulosic compounds such as cellulose nitrate, cellulose acetate, cellulose hydrate and cellulose ethers, such as ethyl or benzyl cellulose; urea formaldehyde and phenol formaldehyde condensation products; glyceral phthalate resins, more commonly known as glyptal resins; and similar transparent resins and plastics. The layers 70 are joined by spots 71 of adhesive or of plasticizer. The plasticizer is one suitably selected to effect a softening of the plastic material 70 and the adjacent plastic material so as to effectively secure such layers together in a particular spot. The spot adhesion of the adjacent layers produces air spaces 72 which are essential for polarizing effects. The polarization is effected by the light rays such as 73 passing first through the plastic layers 70 and being bent towards normal by the refraction in this layer and then by the same light ray striking the air space whereupon it bends away from the normal as diagrammatically illustrated in this figure. After passing through the air space, the light ray strikes the next adjacent plastic layer and part is reflected as shown by the arrow in the drawing and part is again refracted bending the ray towards the normal; this path is pursued down through the subsequent layers and air spaces so that the light is polarized as it passes through this composite of plastic layers and air spaces. It is desirable that the spacings of the adhesion inducing means between the respective adjacent layers be so spaced that a substantial portion of the light rays passing through the composite passes through at least about fifteen layers of plastic material and the corresponding air spaces. In this way, proper polarization is effected.

In Figure 6 I have shown a modification of my composite layer polarized means wherein layer 75 comprises a plastic having a relatively high index of refraction as for example a resin or cellulose plastic containing a powdered glass. The glass may be lead glass and be passed in two forms: (1) relatively large, preferably thin flat, plates of circular or other shape; (2) particles of submicroscopic dimension, such as may be obtained in the well known manner by fine grinding and then separation of the smaller particles by colloidal suspension, and by centrifuge or decanting. In the case of this structure the multiple plastic layers need not be used since these embedded flat particles of themselves act as the dense layers. In this case the incorporated submicroscopic particles are such as to optically merge with the plastic base, and result in a compound material having as a resultant, a higher index. Adjacent layer 76 is a layer having a relatively lower index of refraction and this layer may be cellulose acetate. For example, the index of refraction of the layer 75 may be on the order of 1.7 and the index of refraction of the layer 76 which is of cellulose acetate will be about 1.49. The difference in indices of refraction of adjacent layers should be at least .2. Layer 75 and layer 76 are preferably secured to each other by a suitable adhesive 77. If the layers 75 and 76 are by nature such as may be joined simply by heat and/or pressure, then an added adhesive is not necessary; but if they are not an adhesive by nature then an adhesive should be employed to maintain them in desired close contact.

Employing adjacent layers of alternate high and low index refraction materials, the lights rays passing therethrough are polarized in accordance with the fixed principles set forth above in connection with polarization shown in Figure 5.

In Figure 7 I show an apparatus for forming on plastic layers the staggered spots of adhesive which are essential for the formation of a polarized means such as is shown in Figure 5. Here a roll of plastic material 80 mounted on a roll 81 is unwound and pulled over a roll 82. Cooperating with said roll 82 is a drum 83 rotated in the direction indicated by the arrow. On the drum 83 are mounted applicator segments 84 arranged in staggered relation on said drum 83. Said applicator segments 84 are coated with adhesion inducing substances from the roll 85 which receives its supply from the rotating drum 86, mounted to rotate in a tank containing adhesion inducing substance 87. After the respective layers of plastic material 80 are coated with staggered spots of adhesive 87, they pass beneath the pressing rolls 90 and 91 and the pressure from such pressure rolls causes the lamination of the surface layers of plastic material containing staggered spots of adhesive on their surfaces. The arrangement of the spots of adhesive 87 on the plastic layer 80 is shown in Figure 8.

When a multiplicity of plastic sheets are employed to make the polarizer, it is important that the plastic not contain such large quantities of plasticizers or solvents as would tend to physically join adjacent sheet faces. As stated above, it is essential for the obtaining of the polarization effect that there be sharp lines of demarkation between the respective faces and that there be a certain spacing therebetween which, although minute, must be definite. For this reason, when I employ sheets such as cellulose acetate, it is important that the cellulose acetate sheets contain a relatively small amount of plasticizer so as to prevent any molecular contact or actual interfacial adhesion.

In Figure 9 I show a polarizing unit comprising an external transparent casing 100 in which are positioned fixed rods 101 and movable rods 102 which movable rods are held under downwardly exerted pressure by the springs 103. Movable rods 102 are mounted on shafts 104 which are slidably mounted in brackets 105. Multiple layers of plastic material 107 comprising a polarizing means of my invention, such as set forth in Figures 5 and 6 described above, is wound over the fixed rods 101 and movable rods 102 as shown. The downward compression exerted by the spring 103 on the movable rods 102 maintains the composite polarizing film 107 in a taut condition and positions it in predetermined angles with respect to the transparent casing 100. The light to be polarized enters through either side of the casing 100 in accordance with the utility of the unit and passes through the composite polarizing film 107 striking the composite film at such a predetermined angle that the light is polarized during its transmission therethrough. It is to be noted that the rods 101 and 102 are opaque inasmuch as if these rods were transparent the light travelling therethrough would not be polarized because it would not impinge the polarizing composite sheet 107 at the proper angle. Therefore, all light which travels through the unit is polarized by the polarizing film 107 in its optimum polarizing angular position.

The movable rods 102, forced downward by suitable depressing devices, are of particular utility inasmuch as the polarizing means 107 comprises a plurality of layers of plastic material. There normally would be a certain tendency for this so extended layer to stretch and therefore sag. This would impair its polarizing property inasmuch as the composite would then be improperly angularly positioned with respect to the light to be polarized. Further, the adhesive or plasticizer that joins the respective layers of the composite film might in time lose its effectiveness and this would further the tendency of the respective component layers of the polarizing sheet to separate. This is properly counteracted, however, by the constant pressure exerted by the movable rods 102 which maintain the respective layers in close relationship and which acts to correct any tendency to separate. Although conceivably I could exert this pressure at the respective ends of the polarizing film 107, I have obtained measurably superior results by employing the movable rods under pressure through the device as shown, since in this way I have obtained a uniform and constant pressure on all points of the plastic film with no impairment of this pressure by the sectional contact of the polarizing film with the rods 107 such as would be experienced if the pressure were applied at the ends of the film instead of at intermediate points thereof as shown here.

In the walls of the polarizing unit I provide recesses 110 carrying an absorbent material 111 which contains suitable volatilizing substance adapted to maintain the polarizing film 107 in a proper condition. This volatilizing material may, for example, be a solvent or plasticizer adapted to either maintain the originally incorporated solvent or plasticizer in the film by the vapor pressure exerted by this added solvent or plasticizer or its action may consist in replacing any solvent or plasticizer that may escape from the film.

Similarly, the volatilizing material contained in the absorbent material 111 may be of any desired material such as iodine which will maintain in or replace in the polarizing film certain essential substances to prevent decomposition thereof. When using this added volatilizing material, preferably the polarizing unit and its casing 100 are hermetically sealed.

In Figure 11 I show a plastic material 115 containing therein a multiplicity of bubbles 116. These bubbles 116 are incorporated in the plastic material 115 by mixing air or suitable gas with the plastic or by employing the vapor given off by volatilization of any solvent which will cause such bubbles in the plastic mix. The plastic mix containing the air bubbles may be subjected to agitation to reduce the air bubbles to very small size. After a sufficient number of such bubbles 116 are formed in the plastic 115, pressure is exerted on the plastic 115 in the direction indicated by the arrows 117. Thus pressure flattens out the bubbles 116 until they assume the elongated and flattened shape shown in this figure whereupon in combination with the plastic 115 they form a polarizing device. It is preferred that there be sufficient numbers of these flattened bubbles in the plastic material so that light rays passing through will pass through a multiplicity of these bubbles so that the proper polarizing effects are obtained. The path of such light and the polarizing of the light rays is diagrammatically shown in this figure.

Figure 12:
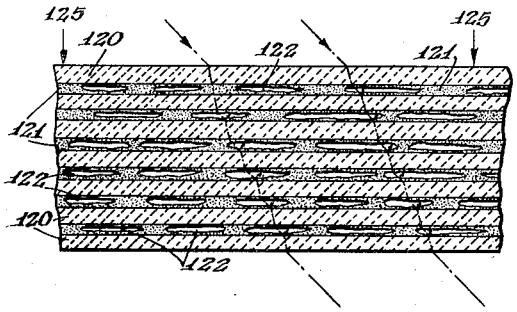
Figure 12 is a cross section of the modified polarizing means of my invention comprising layers of plastic material with intermediate layers of adhesive containing air bubbles which have been flattened out for polarizing purposes.

In Figure 12 I show a modified form of my polarizing means comprising transparent layers 120 which may be of plastic material joined by adhesive means 121 containing bubbles 122. The bubbles may be of air, gas or may result from the use of volatile liquids. As in the polarizing means previously described, these air bubbles are flattened out by the pressure applied in the direction indicated by the arrows 125, which pressure causes them to assume the elongated flattened shape. The light rays passing through the respective layers 120 which have a relatively high index and then through the elongated bubbles which have a relatively low index refraction are polarized as indicated diagrammatically in this figure.

It is to be noted that the various modifications I have shown relate to specific means for carrying out the formation of a polarizing structure in which light travels alternatively through areas of high index of refraction and low index of refraction.

Figure 13:
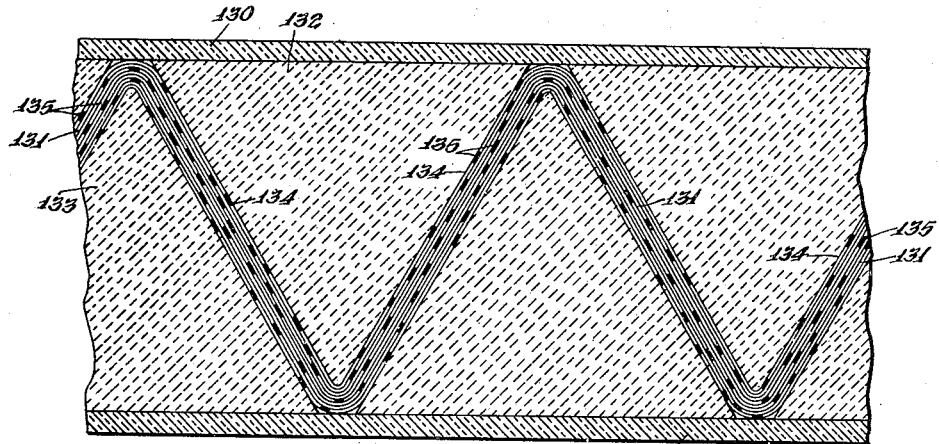
Figure 13 is a cross-section of a polarizing unit adapted to polarize light directed substantially normal to the surface thereof.

Referring now more specifically to Figure 13, I show a polarizing unit adapted to polarize light directed substantially normally incident thereon, which polarizing unit is adapted to be employed for polarizing sunlight or artificial light, as for example in skylights or building constructions generally.

The polarizing action is effected by the composite film 131 which comprises a multiplicity of thin plastic films 134 joined together by adhesion inducing means such as solvent or cement or preformed plastic 135. To properly position this composite polarizing sheet, I place it between blocks 132 and 133 which are approximately triangular in section and which maintain the composite film permanently at substantially a thirty-three degree angle with respect to the normal so that light passing therethrough from the surface 130 of the unit is polarized. The entire mass forms a solid unit by virtue of the joints between the surface 130 and the blocks 132 and the polarizer 131. All elements being transparent, the entire unit is transparent.

For absorbing the reflected light from the uppermost surface of the composite polarized sheet, I may provide dark absorbent areas, as for example, in the form of a dark sheet which bisects the triangular block 132 and extends from midway between the base of that block to midway between the base of the triangle. This sheet is optional and may be used for increased efficiency.

Figure 14:
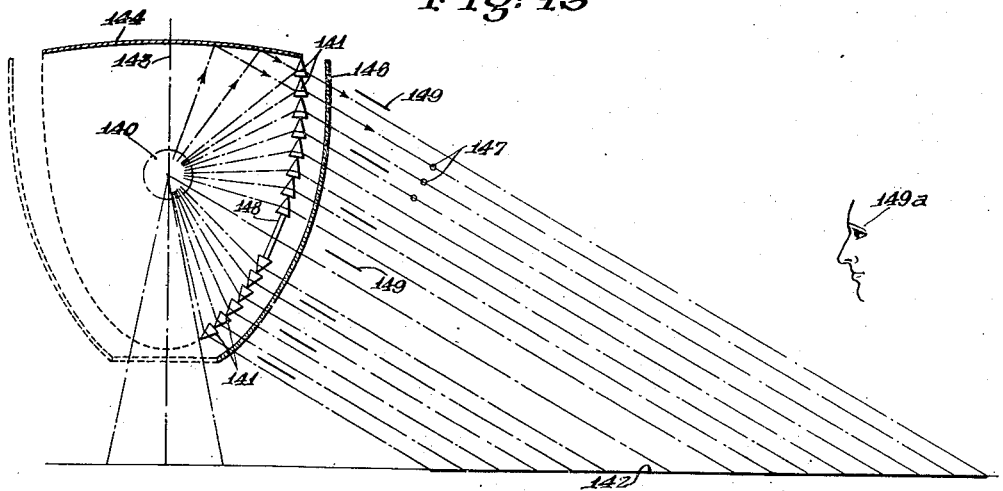
Figure 14 is a cross-section of an illumination means comprising prisms for directing light from a source through a polarizing means.

In Figure 14 I show a means for directing polarized light in a particular desired angular range to a horizontal surface. The light is derived from any suitable light source 140 and is directed by suitably aligned prisms 141 which may be embossed in a glass or suitable plastic molded surface. The prisms are so positioned and constructed as to direct the light from the light source 140 in substantially parallel directions at an angle of approximately 33° to the horizontal surface 142. This parallel beam, of course, is understood to be parallel only in a particular plane passing through the vertical axis 143 and said parallel beams are distributed radially in particular planes or all planes about this vertical axis. I direct these beams by means of the prisms at an angle of approximately 33° because light so directed onto a horizontal surface and polarized during its travel in the manner to be described will provide substantially glare-free illumination for such horizontal surface regardless of the position of the observer. For the light which travels upwardly from the light source 130, I provide a suitable reflecting surface 144 which is of such curvature as to direct light therefrom through the light directing prisms 141.

Although I have shown this reflector as being level with the uppermost prism, for best results I prefer that this reflector be spaced a certain distance above the uppermost prism and it directs light from the source 140 through such space without the aid of the prisms 141, or this reflector may be spherical with its center coincident with the filament and thus act to redirect light thrown upwardly back to the prisms.

To effect the polarization of the light, I provide a polarizing means 146 which is the conventional polarizer of the prior art, namely any suitable sheet polarizer containing, for example, oriented polarizing crystals. The polarizing axis of polarizer 146 is such that the axis follows concentric circles about the common vertical axis, such construction having the effect of polarizing every ray in a plane normal to the plane of incidence. The direction of polarization of the light beams is indicated by the dots 147 which indicate that the plane of polarization of the light is at right angles to the plane of the drawing of Figure 14. For the light from the light source 140 which is initially properly directed, I provide a plane transparent ring 148 which permits the passage of the light without bending it.

Figure 15:
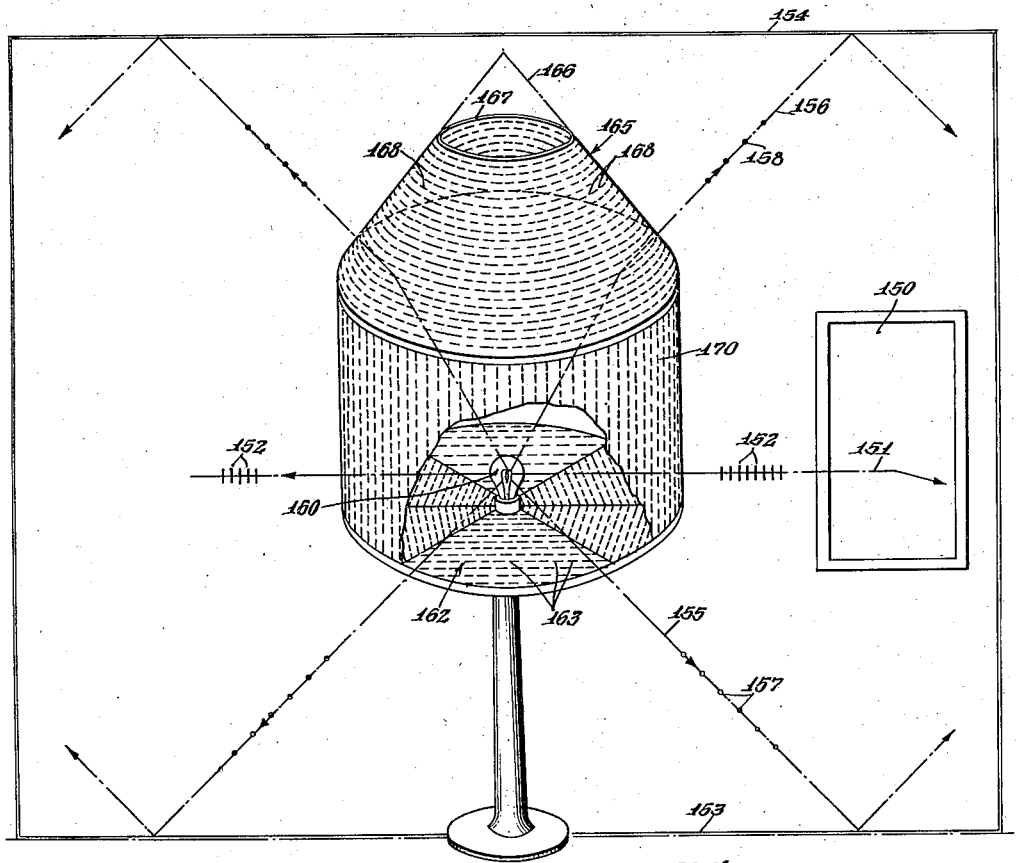
Figure 15 is a means for providing glare-free illumination in the form of selectively polarized light adapted to illuminate both horizontal and vertical surfaces from a single source.

Referring now to Figure 15, I show a particular means for providing polarized illumination in all radial directions from a central source so as to provide simultaneous glare-free illumination for objects having both vertical and horizontal surfaces. To effect this result, it is necessary that light directed onto the vertical and horizontal surfaces be respectively polarized in different planes in its path from the source of illumination. By way of illustrating the vertical surfaces which are to be illuminated, I show a picture 150 and a ray 151 polarized in a vertical plane as indicated at 152 impinging upon that picture to provide a glare-free illumination. I also show a horizontal surface such as a table or a floor 153 and a ceiling 154 and rays 155 and 156 respectively impinging on these respective surfaces, said rays 155 and 156 being polarized in a plane which is normal to their plane of incidence as shown by the dots 157—158 respectively.

To provide this dual glare-free illumination by means of properly positioned polarized media, cooperating with directed beams of light, I have shown by way of illustration, a fixture in which I provide a light source 160 surrounded by a sheet polarizer containing aligned therapathite crystals or other suitable polarizers. The rays which impinge upon the horizontal surface 153 first pass through a circumferential polarizer of the type shown in Figure 31. It comprises segmented radial portions 162 with the axis of polarization 163 lying in the indicated planes. The axis of polarization of these segments coincide with the tangent of the circle whose center is the common vertical axis passing through the light source. By means of these radial segments of polarized sheets, light passing downwardly from light source 160 is plane polarized to provide the properly polarized light beam 155 as described above.

Another means of polarizing rays which are directed upon horizontal surfaces is shown as a frustrum of a cone 165 which may be a completed cone as shown by the dotted lines 166 or may terminate in a cut-off section 167 as shown in dotted lines. The cut-off section 167 may comprise an absorbing surface or an internal reflecting surface of suitable characteristic or may be left open for the passage of non-polarized illumination as here shown. The frustrum of the cone 165 may be constructed of any suitable polarizer such as a plastic sheet polarizer containing properly aligned crystals. The axis of polarization of the frustrum of the cone is shown by dotted line 168 and said axis of polarization follows the circumference of concentric circles having a center in the common vertical axis of the cone. Light then passing from the light source through this cone comprising the polarized sheet is properly polarized as shown at 158 for the light beam 156. It is understood that the frustrum of the cone or the completed cone shown may also be applied in lieu of the circumferential polarizer 162 to the lower horizontal surface. In other words, I provide the cone or cone frustrum shape having a polarizing axis as indicated, as an important, independent aspect of my invention to provide proper polarization for light to be directed upon horizontal surfaces. Such a cone frustrum could also be utilized in lieu of the plastic polarizing disks shown in Figures 1 or 34 in connection with lamps of the design there shown, or alone in connection with ceiling lamps as shown in Figure 27.

For light which is to be simultaneously directed onto vertical surfaces such as picture 150, I provide a cylinder which may comprise a sheet polarizer or segmented flat strips as shown in Figure 27. It is important that the axis of polarization be as indicated by the dotted lines 170 for illuminating vertical surfaces. In this case, the axis of polarization of the polarizing cylinder is such that these axes are all parallel to the common vertical axis. The effect of this construction is to polarize horizontally-directed rays 151 in a vertical plane as shown at 152 and furthermore provide glare-free illumination for such vertical surfaces. These horizontally-directed rays are such that they are substantially parallel to horizontal surfaces 153—154 and so cannot be reflected from these horizontal surfaces to cause a glare. It is understood that rays 151 are also directed upon vertical surfaces at approximately 33° so as to provide the proper angle of incidence for best glare-free illumination.

To effect this proper angular direction, it is best to provide block-outs or louvres and prevent a direct 90° angular impingement of the polarized light onto the vertical surface. Areas which are not illuminated because of these block-outs can be properly illuminated with glare-free polarized lamps suitably spaced apart which are positioned to direct, at the proper angle, polarized light therefrom as shown in Figure 25. Figure 15 is purely diagrammatic and is reduced to essentials, but it is understood that the principles embodied therein can be improved or enhanced by additions of suitable reflectors, diffusing mediums and all other well known devices common in the art.

Figure 16:
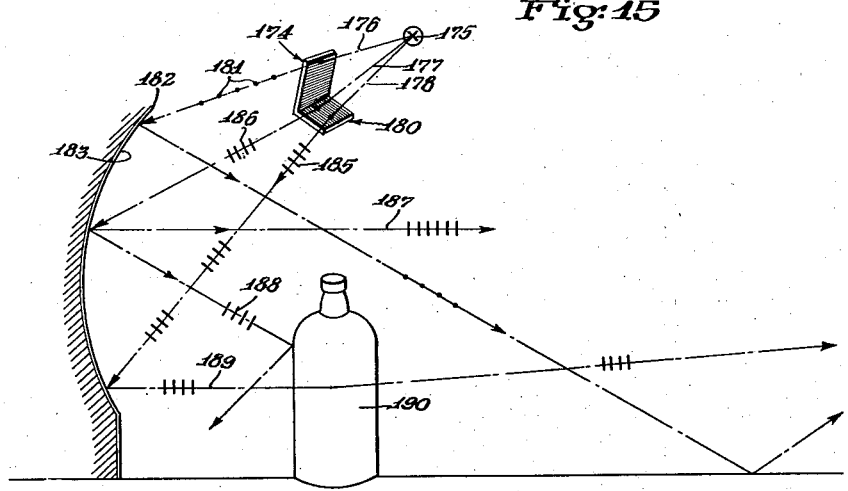
Figure 16 is a diagrammatic showing of a system of general room illumination adapted to provide low intensity light and glare-free illumination of vertical and horizontal surfaces simultaneously.

In Figure 16 I show a system for providing glare-free low intensity light for a room and its contents which, of course, comprise both horizontal and vertical surfaces. To do this, I provide simultaneously horizontally directed light rays containing vertically plane polarized light and light directed upon horizontal surfaces containing light polarized in a plane normal to its plane of incidence, both such families of rays being simultaneously projected. To carry out this system of illumination, I provide a light source 175 which simultaneously projects light rays 176, 177 and 178 through polarizers 174 and 180. Polarizer 174 has an axis of polarization adapted to polarize light beam 176 so as to provide light vibrating in a plane normal to the plane of final incidence of light as shown at 181. This so-polarized light is directed onto a suitable reflecting surface 182.

Surface 182 has a suitable reflecting surface such as a metallic reflecting surface. For example, 182 might be a wall of suitable curvature covered with aluminum particles in a transparent vehicle or the wall might comprise a metallic foil paper which might contain embossed designs for the purpose of ornamentation. In the event that the general plane of the wall is desired to be substantially vertical, it is contemplated that the wall paper be suitably embossed or molded with directional metallic planes to cooperate with the aforementioned light source so as to direct a polarized beam upon horizontal surfaces at the angles indicated in this figure. Specifically I mean by this that I may provide angular directing reflecting surfaces comprising a multiplicity of suitably oriented facets obtained by molding or embossing which, although collectively positioned in a substantially vertical plane, effectively act to direct light therefrom in the angular range which would normally be obtained by a plane surface having the curvature indicated at 183.

Referring now to the path of the light ray 176 after reflection from the reflecting surface 182, this polarized light is directed downwardly upon horizontal surfaces at the best angle to provide glare-free illumination. This range is, for example, from 20° to 70° with a preferred angle of approximately 33°. Now referring to the rays intended for the illumination of vertical surfaces, specifically 177 and 178, I provide for the polarization of these rays by polarizer 180 which polarizes said rays in a vertical plane as indicated at 185 and 186. Rays 177 and 178 are impinged upon the wall reflecting surface 183 which is of the character previously discussed and which is such that the particular curved section or embossed section cooperating with the directed rays 177 and 178 produce horizontally reflected rays 187 and 188.

In the drawing it is understood that rays 187, 188 and 189 are all traveling in horizontal directions; any appearance to the contrary being due to the perspective of the drawing. By horizontal directions is meant that the rays travel in a substantially horizontal direction, but of course there will be some deviation therefrom due to scattering and diffusing effect on the reflecting surface 183. A bottle 190 is shown as illustrative of an object having vertical surfaces.

It is to be pointed out further that vertical rays 187, 188 and 189 are preferably constrained by properly directing the reflecting surfaces or by blocking members so that said rays impinge upon said vertical surfaces at substantially the proper angle therewith.

By the provision of a wall surface which imparts the indicated angular direction of the respective rays and which comprises a reflector that reflects polarized light, I provide not only for the aforementioned glare-free illumination of both vertical and horizontal surfaces, but I also provide a low intensity soft illumination within the room.

Particularly I have provided a new system of illumination which comprises the directing simultaneously of a multiplicity of light rays, polarizing these in suitable planes for the ultimate purpose of providing glare-free illumination for the particular surfaces which the light rays are to illuminate and for further carrying out this scheme I have provided metallized or other suitable non-depolarizing reflecting surfaces of large area which, for example, may be the walls or ceiling of the room and as a further modification of this system I provide an ornamentation of these surfaces, such ornamentation being such as to fully absorb the light in certain areas or to reflect it without depolarization.

It is to be noted that the polarizing means 174 and 180 comprise two polarizers having their axes of polarization at right angles and that these polarizers are respectively positioned so as to intercept and properly polarize light which after reflection from the cooperating reflecting surface is directed substantially onto particular planes.

Figure 16 intended to be illustrative of a broad new principle of great importance and utility and is not limiting in any way, as many constructions thereto of devices and methods well known in the art could be made, all without departing from the broad scope of this invention.

Referring now more specifically to Figure 17, I show a polarizing unit 200 which comprises a multiplicity of plastic strips 201 separated by spaces 202. The strips are combined by applying a solvent to the edges thereof as at 203, which solvent effectively dissolves the surface of the strip at that point and causes an amalgamation and solid joining up of the respective strips. In lieu of a solvent, I may employ a thermo-adhesive or adhesive compounds generally but I particularly prefer to employ an adhesive means containing a solvent inasmuch as such solvent will have an effective sealing action on the edges of the composite to permanently seal the assembled strips against the entry of deleterious influences. It will be noted that the strips 201 are positioned with respect to each other in their composite form at a predetermined angle. This angle is such that the light beam 205 may be substantially normal to the plane 206 of the polarizing unit 200.

A feature of this device is that the strips 201 may be placed and permanently held in position at a larger angle with respect to the ray 205, because after emerging from the first strip, the ray is refracted at point 207 so that it assumes a greater angle of incidence upon striking the succeeding strip 208.

As a consequence of this construction I may employ a fewer number of strips than would be required if the lessening of the angle of incidence did not occur as a result of the first refraction. That is, because the plastic strips are at a more acute angle with respect to the plane 206, fewer strips are necessary to provide the necessary multiplicity of strips through which the light must pass to be properly polarized. In the fabrication of this article, it is desirable to employ as few strips as possible per unit area to provide effective polarization and the method I employ here is a device to minimize the number of these strips by increasing the angle which these strips may make with the ray 205 without deviating from the proper critical value for best polarization of the beam directed normal to the surface 206. That is, the strips are laid out flatter in their assembly and hence extend farther along the extent of the unit which is in the direction along the edge 210.

Another feature of this device is that the rays which during polarization are reflected as from 208, (ray 211), are reflected internally between the respective sheets until substantially absorbed, as shown.

The most important feature of this particular polarizing device is that the strips of preferably plastic material are so arranged angularly with respect to each other and spaced to provide a certain spacing between the respective sheets so that light such as 205 striking the unit substantially normal to its surface 206 passes through preferably 25 separate plastic sheets and the spaces therebetween so that optimum polarization is effected, these sheets being joined at their outermost edges into a continuous surface which thereby forms the entire device into a permanent sealed substantially unitary construction. Although I have set forth that the optimum number of sheets is 25 through which the light must pass, I have found that the effective range is substantially from 15 to 30.

As further illustrative of the construction of this device, refer to the reduced triangle 214 which is diagrammatically attached to unit 200. The line 215 which is the base of the triangle is parallel to the edge 210 and intercepts 25 sheets which are included between the hypotenuse 213 of the triangle and the base 215. Fine lines 217 represent the reduced strips 201. The angle 216 between the plane of the strips and the normal incident ray 205 bears the following relation to the thickness of the strips and the total thickness of the unit:

$$T = \frac{nt}{\sin \angle 216} \qquad \text{Equation A}$$

where T is the total thickness of the unit, $n$ is the number of sheets selected, which may be equal to 25, and $t$ is the thickness of the sheets plus the airspace adjacent thereto.

As a further definition for the best construction of this device, $\angle 216$ is defined as follows:

$$\angle 216 = \cos^{-1}\left(\frac{\sin \angle 219}{\mu}\right) \qquad \text{Equation B}$$

where $\mu$ equals the index of refraction and $\angle 219$ is the critical angle of incidence of the light ray striking the second plastic strip and subsequent plastic strips, this angle being the optimum polarizing angle for the light.

It is further characterized by the following:

$$\angle 219 = \tan^{-1} \mu \qquad \text{Equation C}$$

where $\mu$ is equal to the index of refraction of the plastic material which is uniform throughout.

Combining B and C I obtain an equation which gives a definite angle 216 for any particular value of the material used, thus:

$$\angle 216 = \cos^{-1} \frac{\sin (\tan^{-1} \mu)}{\mu} \qquad \text{Equation D}$$

Thus I provide a simple polarizing device comprising combined and slightly spaced preferably plastic strips permanently positioned at the optimum polarizing angle with certain definite relationships as above set forth with regard to the light to the thickness of the unit, which is determined by the angular position and the number of strips, namely about 25, which the light 205 is to traverse for optimum polarization thereof. For the best operability of this device, the spaces 202 between the respective plastic sheets 201 should be small relative to the thickness of the plastic sheets. In other words, if the plastic sheets are in the order of .003, the spaces should be in the order of .0003 of an inch or less. The polarization is effected, of course, in this unit, as in the various modifications outlined above, by the respective abrupt changes in index of refraction in the plastic strips and the airspaces therebetween. Although I term the spaces between the plastic strips airspaces, I include any medium that represents an abruptly different index of refraction of sufficient magnitude, namely .2 or more, and these spaces may be of any gas or liquid or solid material having these requirements.

This unit is characterized from a structural standpoint by the fact that it polarizes effectively light directed normally to its surface and also is of such simple construction as to be readily available for many purposes.

In Figure 18 of the drawings, I have illustrated diagrammatically the manner in which light conventionally acts upon a surface of insulating material. Let it be assumed, for example, that the reference character A constitutes the object to be viewed and that this object is an insulating material, such for example, as a transparent plate of glass 2″ having an upper surface S and an underlying wooden body 3″. The object A may, however, constitute a body 3″ which it is desired to observe and over which is positioned a transparent coating 2″ or the part 3″ may constitute a sheet of paper having printing thereon with a gloss finish corresponding to the part 2″. I have found that all insulating surfaces of whatever character possess these properties; the surfaces may be indeed of such diverse character as that of cloth or a rug, which ordinarily are not thought of as having a glossy finish. Nevertheless the principle herein explained for the comparatively simple case of say a glass plate over a grained wood surface extends to and includes all possible surfaces; except those of conductors such as metals. There is always an improvement in the contrast of adjacent areas of differing absorptive ability when the light component polarized normal to the viewed surface is eliminated according to this invention.

In any event, the mode of operation is the same. In this figure, two vertical planes are shown. The surface S may, however, be other than horizontal in which the planes 4″ and 5″, normal thereto, will be other than vertical. The vertical plane 4″ is normal to the upper plane surface of the part 2″, while the plane 5″ is normal to the plane 4″ and normal to the upper plane surface of the part 2″. The light source indicated at 6 is presumed to be substantially in the plane 4″, while the observer or objective 7″ is presumed to be in the same plane. Ordinary light from any suitable source 6″, illustrated as a candle, although it may be natural or artificial, either radiant or optically projected, passes from the source 6″ to and impinges upon the surface S at a point designated 8″. Upon contact with this surface at 8″ which we will assume to be a polished surface, the beam is split into two parts, one part 9″ is reflected directly from the surface and through such reflection is substantially polarized in a vertical plane 4″, as indicated by the lines 10″ which denotes polarization in a plane normal to the surface 2″. The other part 11″ is refracted at the surface of the part 2″, passes downwardly through said part and impinges upon the more or less light diffusive upper surface of the part 3″ at a point indicated at 12″. The diffusive character of the part 3″ at this point reflects the thus refracted beam in an upward direction through the thickness of the part 2″, so that it merges from the upper surface of the latter in diverging rays constituting a beam 13″ diffused to the extent that it will not produce glare. The ray 9″, however, substantially plane polarized in a vertical plane, may be referred to as the glare effecting portion of the transmitted beam and this impinges upon the eye 7″ and causes the glare, making it impossible for the eye to properly analyze the characteristics of the diffused beam 13″. The foregoing is illustrative of conventional observation and constitutes no part of the present invention being here illustrated merely to form a basis by which the present invention may be more readily understood.

Beam 9″ being surface-reflected is not affected by the absorptive properties of the underlying layers of the surface such as 3″. The intensity of 9″ is therefore constant over the entire surface S. When the observer forms an image of the surface viewed, adjacent areas of that image are more readily distinguished if the ratio of the larger intensity of one area to the lesser intensity of an adjacent area is great. The beam 9″ always contributes to reducing the ratio of intensity of adjacent areas of the observer's image of the object viewed. Thus, for example, if the absorptive ability of the underlying layers of adjacent areas of a surface be say, such that the 90% of the light that is transmitted thereto (10% being surface reflected) and one area diffusively reflects 20% of the light, and the adjacent area diffusively reflects 5% of the light; then if the surface reflected component is eliminated the contrast ratio is $$\frac{20\%}{5\%} = 4 \text{ times}$$

whereas if the surface reflected component is not eliminated, the contrast ratio is $$\frac{20+10}{5+10} = \frac{30}{15} = 2 \text{ times}$$

By reference now to Figure 19, wherein similar parts have the same reference numerals, the source of light 6″ constitutes a source of ordinary light. It is adapted to disperse its rays in the direction to impinge upon the surface S of the part 2″ at the point 8″, as heretofore, but between the source 6″ and the point 8″, is interposed a polarizing medium P, so constituted as to plane polarize the light from the source 6″ in a plane normal to plane 4″ and including the ray from the source 6″, as indicated by the lines 14″, whereby the light passing through said polarizing medium and impinging upon the surface S at 8″ is divested of the beam 9″, shown in Figure 18, i. e., the vertical component of the transmitted beam, while the component 15″ of such transmitted beam is refracted at the surface S and passes downwardly through the part 2″ to impinge upon the lower surface of the part 3″; or in general passes below the upper surface layer into the body of the material where it may be differentially absorbed and diffusively reflected by adjacent areas. It is thereupon reflected from said part 3″ in a diffused manner, resulting in the diffused reflected beam 13″, only, it being noted from Figure 19 that the beam 9″, appearing in Figure 18, and plane polarized in the vertical plane 4″ is absent. The beam 13″ is of such character that it will not cause glare, but will on the contrary provide clear contrast between adjacent portions of the part 3″ and permit them to be effectually seen by virtue of the reflected diffused beam 13″ to which I have referred, for it will be observed that the glare causing vertical component has been wholly eliminated, while the remaining component has been so modified as to render glare therefrom wholly absent or negligible.

In the showing of Figures 18 and 19, I have referred to only one point 12″, but it is to be understood that the phenomena described is duplicated for other points in the upper surface of the part 3".

It will, of course, be understood that the parallel lines indicating planes of polarization shown in Figures 18 and 19 are not intended to indicate complete polarization nor degree thereof, but merely show the predominating planes of polarization.

I have referred in connection with Figure 19 to the employment of polarizing mediums more specifically designated by the reference character P. In practice, these polarizing mediums may partake of various forms and I, therefore, do not limit the present invention to any specific construction, but will hereinafter describe several alternate polarized devices which may be employed in this connection. However, for the purpose of illustration at this point, it may be stated that I may use with high efficiency the polarizing medium fully disclosed in my application, Serial No. 662,090, filed March 22, 1933, which issued into Patent No. 2,104,949, and directed to "Crystalline formation." Said application discloses among other things a polarizing medium comprising a transparent supporting member, such as a sheet of glass and on one surface of which sheet is supported a crystalline layer having the characteristic that when a light beam is passed through the glass and through the layer, the emergent beam will be polarized in a predetermined plane. This structure is referred to here as well adapted for the purposes exhibited in Figure 19, wherein the said polarizing device may be positioned as indicated at P in this figure. In the arrangement of Figure 19, this polarizing device P may be mounted on or form part of a lamp casing or fixture. The objective 7 may be the eye of an observer, the lens of a camera or the like.

In Figures 20 to 32, I have shown practical examples of the embodiment of Figure 19 in commercial lighting fixtures, some of which are adapted for direct lighting and some for indirect lighting.

Referring first to Figure 20, wherein I have shown direct lighting, such as may be conveniently incorporated in a desk lamp, 17" designates the lamp standard to which an appropriate lamp casing shown in the form of a reflector 18" is pivoted at 19". An electric lamp 20" is housed within the reflector and current is supplied thereto through wires in the usual manner. Across the open end of the reflector 18" is a polarizing medium P which may conveniently take the form which is shown in my copending application, above referred to, and I have shown mounted adjacent the polarizing medium and on the interior of the reflector a diffusing plate 21" of ground glass or the like to break up the image of the lamp filament prior to the passage of the beam through the polarizing device P. The beam from the lamp passes through the diffusing element 21" and then through the polarizing element P which serves to plane polarize the emergent rays 22" and 22" in planes normal to a plane normal to A and including the rays 22" as described in connection with Figure 19. As such, rays 22" impinge upon the object A with the same results as described in connection with Figure 19. Light polarized in the plane of polarization normal to the surface A is thus eliminated and the diffused component results in the beam 13" being composed only of light differentially reflected by the contrasting areas of A. In Figure 20, the casing 18" of the lamp may be pivotally moved on the standard 17" into such optimum angle as to give the best results for reading or otherwise as may be desired.

The structure of Figure 21 differs from the structure of Figure 20 merely in that a different form of polarizing medium P is employed. In this instance, polarization is accomplished by passing the light beam through an appropriate pile of transparent plates of glass or any other appropriate polarizing substance or substances so that the emergent beam 22" is plane polarized in a plane; a line in which, normal to the ray 22" is parallel to the surface viewed; the reflected polarized beam 22a" here being absorbed on an optically black surface as shown.

The casing 18" shown in Figure 21 is, for a portion thereof adjacent the source of light, of parabolic configuration, so as to parallel the rays of light which pass through the polarizing element P. Beyond this parabolic part of the reflector, the extended portion of the casing is preferably lined or coated with some absorbing medium, such, for example, as a flat black coating indicated at 18a" to absorb those rays of light which cannot efficiently be paralleled, as well as such rays as are reflected from the surface of the polarizing medium P. In this form of construction, moreover, an absorbing shield 18b" is also preferably positioned forwardly of the source of light to preclude the passage through the polarizing medium of the direct divergent rays from the source of light and which could not be efficiently polarized.

In the structures of Figures 22 and 23, the same standard is employed as in the preceding structures, but the casing 23" is of somewhat different form. Ordinary light from the lamp 20" is first passed through an appropriate optical system 24" which parallel the rays causing them to impinge upon an appropriate set of plates P of transparent material or materials and the last plate of which is preferably coated at its back surface with lamp black or the like. The plates are set at such angle that the beam 22" will be reflected in the desired direction and the light of said beam will be plane polarized in a plane, a line in which, normal to the ray 22", is parallel to the surface A.

In Figure 24, I have shown in perspective section a structure substantially the same as shown in Figure 20, but with the diffusing plate 21" set a further distance away from the polarizing medium P. The reflector 18" employed in this connection is practically the same as shown in Figure 20 and in these figures, these reflectors are preferably, though not essentially, parabolic. The reflector of Figure 21 is essentially parabolic for the rays impinging on plates must be parallel to be effectively polarized.

In Figure 25, two sources of light of the character shown in Figure 20 are employed being positioned in opposed relation to one another, so as to collectively illuminate the object A which in this showing may be a picture, such as an oil painting or the like or a piece of tapestry, the lamp casings 18" being tilted at the proper angle to give maximum non-glare illumination and to properly cooperate with one another.

Reference has hereinbefore been made to a polarizing medium P used in conjunction with a separate diffusing medium 21". If desired, these two mediums may be incorporated in a unitary construction Pd forming part of this invention and shown in Figure 26. In this figure, a transparent plate 25", such as a plate of glass, is coated on one side with a polarizing film P and at its opposite side, it is provided with a diffusing surface 21″, which may conveniently be produced by either employing a diffusing coating or sand blasting surface of the plate 25″. The said composite construction may be used in conjunction with any practical arrangement employing the invention, as set forth in Figure 19, i. e., any structure wherein the beam is adapted to pass through the diffusing and polarizing elements.

Figures 28 and 29 show another application of the invention to direct lighting and more particularly in a wall fixture. Here two composite units Pd, as shown in Figure 26, are mounted in an appropriate frame 26″ before an appropriate source of light 6″ with the result that the beam which passes through the units Pd will be plane polarized in a plane normal to the vertical. A room properly lighted by a series of fixtures of the kind shown in these figures will be devoid of glare on horizontal surfaces.

Another adaptation of the invention is shown in Figure 27 in which figure a plurality of strips each comprising composite units Pd are mounted in a circular frame 26″ constituting a suitable support and within the frame is positioned a source of light 6″ such as an electric lamp. All rays of light which pass through the units Pd will be plane polarized in a plane normal to the vertical plane.

In the structure of Figure 30, a somewhat different arrangement is shown. The source of light 6″ is mounted within the lamp casing 18″ across the top of which is positioned a polarizing plate or a composite plate, such as shown in Figure 26. The light is thrown from the source of light directly and by reflection upwardly through the polarizing plate P and on to a conical diffuser 27″, preferably of metal, positioned above the same.

The polarizing medium used in the construction of Figure 30 is shown diagrammatically in Figure 31 and must be of special construction. It is preferably built up of a plurality of segmental parts or sections, each of which is adapted to polarize the planes normal to the radius, so that when these several sections are assembled, as shown, polarization will take place substantially normal to all radii. That is to say, light passing through any portion of the polarizing medium will be properly polarized before impinging the reflector 27″.

The surface of the diffuser 27″ if of metal will simply reflect the beam as indicated. This surface may, however, be composed of metal flakes in transparent suspension with haphazard orientation, so as to reflect the light in all directions. Such a surface may be conveniently formed by using aluminum paint. My observations show that metallic surfaces will not depolarize an incident polarized beam so that even though the surface of the part 27″ is simply metallic surface, satisfactory reflection will result without glare, but I preferably use a diffusing surface of metal flakes to get a better distribution of the light. If the part 27″ were non-metallic, such as a flat white paint or calcined background, the polarized beam impinging thereon would be depolarized, but this might be overcome by covering said surface with metal flakes as stated.

The structure shown in Figure 32 is a fixture embodying the combination of several of the arrangements hereinbefore referred to. Light from the source 6″ passes through an optical system 28″ to parallel the rays and thence is passed through a polarizing pile P which plane polarizes the beam in a horizontal plane. The thus polarized beam is received upon the metallic or other non-depolarizing reflecting surface 29″ and reflected upwardly against a diffusing surface 30″ embodying the metal flakes in transparent suspension and with haphazard orientation and from this surface the polarized light is reflected in diffused condition throughout the room in which the fixture is suspended. In order that the light may be dispensed from all sides of the fixture, the optical system 28″ may be in the form of an annular lens coaxial with the source of light 6″ and the pile of plates which constitute the polarizing device may be in the form of hollow truncated walls coaxially arranged and of the same pitch. Similarly, the reflector 29″ may be in the form of a frustum of a cone with the deflector 30″ similarly formed as will be understood by those skilled in the art. 31″ is an optically black absorbing surface for the discarded polarizing component.

The structure of Figure 33 is quite similar to the structure of Figure 32, with the exception that the polarizing element P is in the form of a pile of plates with the outermost plate having a light absorbing backing 31″, such as a lamp black coating, such as to function in the manner described in connection with Figure 23, the light being polarized during reflection instead of refraction as in Figure 32.

The foregoing commercial embodiments of the invention are illustrative of a wide variety of apparatus which may be employed in practising the present invention. They all, however, operate on the generic principle that the light is polarized prior to impingement upon the surface to be viewed. In certain of the apparatus showings, the object is viewed by direct illumination while in others the object is viewed by so-called indirect illumination. In every case, however, the glare producing component of the light beam emanating from a common source of light is eliminated in such manner as to obtain a highly satisfactory contrast between different portions of an object having areas of varying degrees of light absorptive properties. As a result, the observer will see these different portions of the object in proper contrast without eyestrain or optical fatigue.

In direct lighting arrangements, such, for example, as illustrated in Figures 20 and 21, direct view of the source of light is shielded by the casing 18″, while the angle at which the casing is tilted shields direct rays of polarized light from the line of sight of the observer, so that he views the object A solely by reflected light. The angle of adjustment of the casing is such in these cases as to give the best results. In the forms of the invention typified by the non-glare surface illumination, whose beam is included in the line of sight of the observer, such, for example, as in Figure 27 or 28, a diffusing screen should be used to give a large uniform field of lower intensity. In this connection, it is important to note that the polarizing plates referred to form a highly practical way of polarizing light coming from a diffusing screen, since they polarize well for rays having all angles of incidence.

In practically carrying out this invention, I prefer, in all instances where the source of light is within the lines of vision of the observer, to utilize in conjunction with the polarizing medium a diffusing screen in order to obtain a large field of illumination of lower intensity. However, where the light is contained within a casing or holder so constituted as to shield the source of light from the direct view of the observer, such a diffusing screen is not necessary although it may be used if desired.

Referring now more specifically to Figure 34, I show a further form of illumination means for providing polarized light. This particular form of my invention is characterized by the fact that for the major reflecting surfaces I employ a plurality of surfaces belonging to the same family of parabolas. On a suitable base 230 which contains the light switch equipment 234, is mounted a light source 232. The filament of this light source which I characterize by F is coincident with the common foci of all the parabolas which constitute the reflecting surfaces. Below and surrounding the light source 232 is the spherical reflector shield 233, the center of the sphere of which is also coincident with filament F. The sphere is substantially hemispherical with an opening in the bottom. The internal surface of the hemisphere 233 constitutes a reflecting surface which reflects light projected thereon back through the focal point F to the walls of the major reflectors of the lamp. This reflecting surface should be a true reflecting surface that is non-depolarizing, such as a bright chrome finish or any mirror-like finish.

Another function of this reflector is to prevent any direct projection of light from the light source to the surface to be viewed which would cause intense spotting and undesirable glare. It is one of the features of this lamp to provide in addition to polarized illumination, a large field of low intensity lighting.

The light from the filament F that is upwardly and outwardly projected both from the filament itself or back from the internal reflecting surface of the shield through the filament F is thrown upon the major reflectors 234 and 235. These major reflecting surfaces, as can be seen, belong to the same family of parabolas and constitute paraboloids of revolution about the common vertical axis passing through F.

The common axis of parabolas 234 and 235 also passes through F and is characterized by the angle 236 which is preferably equal to about thirty-three degrees, or in other words the angle for best polarization of the transmitted beam. The limit of the upper parabola of revolution is determined by the ray 239 passing through the outermost point on the diameter of the polarized disc 238 at an angle of 33°. It is to be noted that the light source and the reflecting shield are sunk in a plane practically coincident with the plane of the polarizing disc 238. By means of this arrangement I provide a shallow construction for the lamp and hence a more effective lighting unit, and also make possible a new and novel result whereby I obtain a greater efficiency in the transmission of the polarized light by the method to be set forth herein. In other words, I reduce practically to the end point the waste of any light beams within the lamp enclosure.

In the ordinary process of transmitting and polarizing light, it is well known that theoretically perfect transmission and polarization results in only fifty per cent transmission of light. By means of the construction I set forth, I obtain in lieu of the theoretical maximum of fifty per cent light transmission and utilization, and the more practical forty per cent light transmission and utilization, a theoretical transmission of 100%, which is reduced, because of practical inefficiencies, to about 70%. I obtain this greatly increased quantitative transmission of polarized light from my construction because of the reflux action which I obtain and which I shall now describe. It is an important element of this reflux action that I employ as the reflecting surface, a depolarizing material which acts to depolarize polarized light impinged thereon, thus changing polarized light to unpolarized light. The depolarizing surface may be of a suitable white enamel such as a coating having a magnesium oxide base. White pigments are desirable if white light is to be produced and if colored light is to be produced, colored pigments may be employed. I do not use metallic surfaces for this reflecting surface because metallic surfaces are not depolarizing.

I obtain maximum reflection from the surfaces of the major reflectors as well as complete depolarization of any of the light impinged thereon together with a certain amount, but not excessive, diffusion. For purposes of illustrating the reflux action by means of which I obtain the hitherto unknown substantially quantitative transmission of the polarized light, I shall trace the path of a light ray from the filament F.

I show the ray travelling from F to a on the surface of the reflector, whereupon it is reflected to point b on the polarizing disc 238. The ray from a to b is not polarized as is shown by the spoke-like marking 240. When the ray strikes the polarizing disc 238, the transmitted part of the ray c is polarized in a plane normal to its plane of incidence as shown by the markings 241. The remaining part of the ray is reflected from b to d and is polarized in its plane of incidence as is shown by the parallel markings at 243. At d this ray is again reflected, and in being reflected, is depolarized by the reflecting surface at d. From d the reflected ray travels to the point e on the shield reflector 233, whereupon it is again reflected from the shield at point e to the surface of the reflector 235 which it strikes at f. At this point it is also unpolarized light. From point f the reflected ray is directed upon the polarizing disc 238 at point g, whereupon a portion is transmitted through and becomes ray h which is properly polarized normal to its plane of incidence as shown by the dotted markings 245. The remaining portion of the light i is reflected again toward the surface of the outer reflector 234 and is polarized in its plane of incidence.

The process of depolarization, reflection and projection upon the polarizing disc 238 follows again and again until practically no light is left. As a consequence of this construction, it now becomes possible to project polarized light from a lamp without excessive loss by internal reflection and absorption of the reflected polarized light. By this construction I obtain a theoretical utilization of the light from the light source of 100%. I have found that as a practical matter I obtain about 70% of the light. As I have stated before, this is approximately 100% improvement over the effective light obtained in prior polarization devices.

Returning now to the construction of the reflecting surfaces, these may be conveniently constructed as follows: Through F draw the common axis of the parabola at an angle 236 equal to approximately thirty-three degrees. This common axis of the parabola is 246. From F mark off on 246 a distance equal to the radius of the maximum diameter of the polarizing disc.

This is defined by the distance from F to the lowermost point on the reflector 234. From this center of curvature 247 draw a radius starting at the outermost point of the polarizing disc and continue up to any arbitrary point 248 which marks the beginning of the next parabola. In constructing the next parabola 235 the diameter 245 of the lowermost part of this next uppermost parabola 235 is decided upon. A new point is marked off on line 246, such that the distance from the new center of curvature 250 of the line 246 to the focal point F is the same as the distance to the point 249 which represents the continuation of the new parabola. The limit of the upper parabola at 256 is defined by the ray 239 which travels at the desired optimum angle for best polarization of the light and which intercepts the outermost part of the diameter of the polarizing plates 238. The upper parabola may be terminated at the point 246 resulting in a cutaway portion at the top of the lamp for indirect light, or this top portion of the lamp shown in dotted lines may comprise a spherical reflector 257 which reflects light downwardly. This reflector 257 does not belong to the family of parabolas 234 and 235.

The specific construction features of the polarizing means 238 comprise a multiplicity, preferably from 15 to 30, of plastic sheets, sealed at the outer edges 260 and the inner edges 261 and held at these points by outer clamp 262 and inner clamp 263. Concentric supporting rings 265, 266, 267 and 268 render such support to the laminated composite superimposed plastic sheets as to prevent sagging or displacement. These concentric rings are suitably supported by radially extending arms 270 and 271. As shown, the concentric rings may be inset in the radial arms. It is important to note, of course, that the total area occupied by the supporting radial arms and concentric rings is relatively so small that it does not interfere with the light transmitted through the polarizing unit.

Because I consider this presently described lamp to be an extremely important part of my invention, I wish to summarize the principal factors in connection with the construction and physical operation thereof.

1. The major reflecting surfaces of the lamp belong to the same family of parabolas.
2. The axes of the parabolas coincide with the direct angle of incidence for optimum polarization, namely about thirty-three degrees.
3. The end point of the uppermost parabola is defined by the light ray directed therefrom which strikes the polarizing means at approximately an angle of thirty-three degrees at the outermost point of the polarizing means.
4. The radius of curvature of the parabolic reflector is substantially equal to twice the distance between F, the light source, and the reflecting surface and the center of curvature lies on the reflected ray through the focal point.
5. A multiplicity of parabolas may be employed to provide for a shallow lamp bowl and for more efficient lighting.
6. The shallower bowl provides more efficient lighting because there is reduced to a minimum light which is directed against other than the polarizing means and because there is less diffusion or spreading of the light.
7. The lowering of the spreading due to diffusion is important because I desire to employ a depolarizing internal reflecting surface for the major reflectors and such depolarizing reflecting surface has a tendency to diffuse the light. By reducing the path of travel of the light, I reduce the spreading of the light or diffusion.
8. I employ a clear glass bulb as the light source so that light from the reflecting shield is projected for utilization on the walls of the major reflectors.
9. My light source is in substantially the same plane as the polarizing means for greater utilization of the light and more efficient reflection.
10. By employing depolarizing internal surfaces I obtain a reflux action that produces an entirely different measure of increased light transmission of suitably polarized glare-free light.

A further important element of my invention lies in the polarizing disc itself. This polarizing disc is shown in plan view in Figure 35. It is shown in cross-section in Figure 34. As can be seen it comprises a multiplicity of superimposed discs of transparent material. Because of the possibility of easy compositing, and because it can be formed into very thin sheets, I prefer to use a plastic material, as described above. When using such plastic material, I can combine and suitably hold the desired number of very thin plastic sheets preferably about 15 to 30 in number, and preferably .0015 inch thick or less, although the thickness may be of a maximum .004 inch. The multiplicity of thin plastic sheets are held together and about the periphery 290 I apply solvent which may either be a low boiling point solvent such as acetone or alcohol, or a high boiling point solvent, such as dibutyl phthalate or methyl "Cellosolve." The suitable solvent is applied not only to the external periphery 290 but also to the internal periphery 291 and I may further apply pressure to these edges to obtain suitable flow of the respective plastic sheets to get firm adhesion and preferably a unitary mass at these points. The pressure may be applied between rolls, and if necessary, heat may be further applied to facilitate the softening and amalgamation of the respective areas at this point.

By obtaining a flow of the plastic material in these parts, the light unit is completely and permanently sealed against entrance of deleterious influences. The polarizing unit is further so sealed that the respective minimum spacings between the plastic sheets is maintained and separation is prevented because of the low pressure within the unit that would result, the pressure of atmosphere thus permanently maintaining the layers in close relationship.

A further important result of this formation of external and internal plastic rings integral with the polarizing disc is the rigidity which such construction has. By causing a flow at the internal and external periphery of the disc, I, in effect, provide two supporting rings for the unit at these points.

The shape of the unit is, of course, not to be restricted to annular, but may vary according to the shape of the device in which the polarizing unit is to be employed. The edge seal can be effected for any desired shape and in the event that there is no internal opening, the sealing of the external periphery results in a decidedly improved polarizing unit.

Another means of carrying out the above invention is shown in Figure 36, wherein plastic layers 313 are shown on each side of the planular central polarizing layers 307. Incorporated in plastic layers 313 are suitable prismatic inclusions or open spaces 314. As shown, the triangular prisms are formed by extruded openings as the plastic mass travels through a die containing cores of the section shown and of the predetermined spacings shown. Ray 300' entering 313 is bent by successive refractions within the plastic mass at the predetermined angularly positioned surfaces formed by the prismatic inclusions or openings as shown, such that the ray, upon emergence from the first layer 313, assumes an optimum angle for polarization in travelling through the polarizing layers 307'. Upon emergence from 307', a second layer 313, similar to the first layer 313 and suitably positioned with reference to the emerging ray, acts upon the emerging ray to bend it into parallelism with the initial ray 300'.

In the first method, specifically I provide means for reflecting and depolarizing or first depolarizing and then reflecting the reflected component from the polarizing medium. The reflected component is that component which is polarized in the plane or incidence in contradistinction to the transmitted beam which is polarized in a plane normal to the plane of incidence.

I further propose that the above redirecting means be made unitary or integral with the polarizing structure above described. This may take the form of embossings of the respective layers or embossing of the outer supports of these layers, or it may be effected by treatment of the respective layers of the device, preferably of the lower side of each upper layer.

Another embodiment of my invention lies in the use of the composite polarizing unit of this invention in connection with Venetian blinds. By interlacing the composite polarizer between the respective strips of the Venetian blind, I effect first a positioning of the polarizing composite with respect to the light impinged thereon to effect proper polarization of such light, and, by adjusting the angle of the strips, as can readily be done in the standard type of Venetian blind now available, it is possible to adjust the angle of impingement for the oncoming rays of daylight which vary from time to time during the day to always get the optimum effective polarization. Of course, if the conventional polarizer were used in connection with Venetian blinds such as one containing aligned particles of polarizing crystals in a plastic sheet, it would not be necessary to adjust the angle of the strip to obtain maximum polarization.

As another embodiment of my invention I propose the interlacing or weaving of composite strips containing twelve or more thin transparent plastic layers into a fabric which is capable of polarizing light transmitted therethrough when the impinged light is at a polarizing angle to the plane of the fabric.

I further provide as a polarizing unit a composite which is a modification of that shown in Figure 36. Instead of employing the prisms 314 shown there, I propose to employ substantially parallel glass rods or glass fibres or other elongated light refracting or light scattering bodies. The function of the above mentioned light refracting or light scattering bodies is to bend the incident light into a multiplicity of directions in one plane only; this plane being normal to the direction of elongation of the light refracting or light scattering bodies. This may well be effected by the use of a plurality of glass threads lying side by side in a plane substantially parallel to the polarizing layers or a multiplicity of layers of such glass threads could be employed.

These refracting bodies may be incorporated within the transparent plastic material having a different index of refraction than the light refracting bodies.

A light ray striking such a layer will be scattered into a multiplicity of directions and upon emerging from this layer and then passing through the polarizing layers, those emerging rays which are within the polarizing angular range will be polarized, whereas those rays which pass almost normally incident to the polarizing layers (outside the proper polarizing range) will remain relatively non-polarized. All these rays upon emerging from the polarizing layers again strike another light scattering layer similar to that above described and are again scattered in the same plane as above described. The rays which pass through the first polarizing layer almost normally incident thereto and consequently are still unpolarized, will be scattered again by the second scattering layer and most of these rays will pass through subsequent polarizing layers at the proper angle to effect their polarization. The rays which were previously polarized will remain so or become even more completely polarized upon their transmission through the second polarizing layer.

In general I propose polarizing the light by scattering in one plane, polarizing the scattered rays, again scattering and polarizing again, alternately, so that all non-polarized rays are eventually exhausted as they must assume, after at least one of the said scattering operations, the proper angular direction with reference to the polarizing layers so as to become polarized.

My polarizing unit, therefore, comprises spaced parallel layers containing light scattering materials between which are placed sufficient layers of thin isotropic plastic to effect the polarization of light passing from these light scattering bodies. Successive layers of light scattering bodies and composite polarizing layers are employed alternately. For example I can use a light scattering layer followed by seven thin polarizing layers, followed by another light scattering layer, followed, in turn, by seven more thin polarizing layers; this being repeated until there are, for example, four light scattering layers with four composite polarizing layers comprising seven layers each of thin plastic material placed alternately between the light scattering layers.

In United States application No. 755,557 of which this is in part a continuation, I refer to the polarization effect obtained by passing the light beam through an appropriate pile of plates of glass or any other appropriate polarizing substance or substances. In the present application, I specifically describe means for efficiently and commercially producing polarization effects using such appropriate piles of plates of these above mentioned substances other than glass because glass is not presently obtainable in suitably thin non fragile sheet form because of other deficiencies in essential characteristics.

The polarization unit of my invention comprises multiple sheets of thin transparent material of the following characteristics:

Thickness: Maximum thickness—about .004 inch; preferred range—.0015 inch or less; desired thickness—about .00088 inch.

Number of sheets: Range—15 to 30; desired number—about 25.

Composition of sheets: Isotropic transparent plastic having surfaces which do not ordinarily adhere to one another. Surfaces should be quite plane and have a minimum of irregularities.

Distance between sheets: Greater than the wave length of light since if a smaller space is employed, interference phenomena may take place which appear to affect polarization. The maximum spacing is about .010 inches. More than that causes unsetting and consequent distortion in the polarization and transmission of the light. When solid sheets separated by air or gas spaces are employed, the spacing desirable is equal to a few wave lengths of light.

Spacing can be effected: 1. Suitable spacing means such as spot adhesive or preformed spaces which may be adhesive at intervals between the faces of adjacent sheets. 2. Air or gas included and sealed between adjacent sheets. 3. Spacing at the edges and transverse tension on the entire assembly.

Assembly of composite polarizing unit can take place under mechanical or slightly reduced air pressure during which time it is sealed. Then atmospheric pressure holds the sheets together.

When the composite is formed continuously as shown in Figure 7 or when composites of large area are made, adapted to be cut to small size for fabrication, the air spacing cells are preferably of small lateral extent so as to prevent extended separation.

A support for the composite unit may be formed to totally encase the unit as by dipping the formed composite layers in a suitable hardenable transparent material which upon hardening renders surface support and effectively seals the edges of the unit.

One way of eliminating the buckling effect in the plastic sheet composite is to allow for relative freedom of motion between the respective layers and the support elements in a lateral direction while at the same time maintaining the planular position by means of the supporting elements. This may be effected by a flexible coupling or joint between the respective layers, which also may act as a seal, such as rubber taped edges.

One of the problems connected with the utilization of multi layers of thin plastic sheets which are hermetically sealed against deleterious influences is the expansion of the gas contained in the spaces between the layers with a consequent tendency for the layers to bulge or wrinkle. The expansion is usually caused by heat as from the light source with which the unit is being used. However, when the composite is formed under slightly reduced pressure, the gas in the spaces is initially at sub atmospheric pressure so that subsequent heating during utilization as in a lighting fixture will not expand the gas to such a point as would cause it to bulge or wrinkle the plastic layers.

The heat to which the composite polarizing unit is necessarily subjected when used in a light fixture with a filament light source may be reduced by employing a dark exterior coating which radiates heat on the exterior enclosure of the light source. This enclosure may be the reflector. A maximum practical area enclosure should be employed to afford adequate radiation of heat.

To protect the composite plastic against heat effects, I further propose to coat the interior of the reflecting surfaces with a heat absorbing material such as glass or plastic containing dissolved iron salts or any of the well known heat absorbing materials. This may take the form of a clear glass enamel containing heat absorbing material superimposed over the depolarizing reflecting surface.

Alternatively, the heat absorbing material could be employed as the uppermost layer of the composite polarizer.

For effecting the rapid manufacture of the polarizing unit which operates on the principle of abrupt changes in index of refraction shown in Figures 5 and 6, I may extrude the plastic through a die which contains suitably positioned cores which cores form the spaces 72 shown in Figure 5. To maintain the spacing of the plastic at these points I may employ hollow core parts in the die through which I supply gas or liquid under pressure to these spaces. When I employ a thermoplastic, I prefer to use a relatively cold gas or liquid to chill and rapidly set the walls of these spaces. If the material is such as hardens under the influence of suitable chemical agents such as acids, alkalis, etc., then I supply such setting agents through the above mentioned hollow cores. I may remove such setting agents if they have deleterious results by flushing with a liquid or gas.

A still further method of manufacturing comprises extruding layers of plastic and providing the necessary spaces therebetween by shaping the extruding sheets so that they have formed integrally therewith, surface projections at suitable intervals to effect the proper spacing of the sheets. The extruded sheets are preferably joined before setting so that adhesion between the respective sheets is readily obtained without additional adhesives.

Alternatively, I may simultaneously extrude a multiplicity of layers, said layers having alternatively different indexes of refraction as shown in Figure 6 and combining there layers if necessary between pressure rolls. Thus from a single extrusion die, I form a complete polarizing device from isotropic plastic or plastics.

The light directing polarizing unit shown in Figures 36 and 37 may be formed by simultaneous extrusion of the respective component parts as described above. The extrusion die is so shaped as to form upper and/or lower layers with suitably shaped surfaces so as to give the prism action that is essential for properly directing the light to the centrally positioned composite layers at a polarizing angle.

The light directing effect can further be obtained in the extrusion operation above described by including prism bodies, properly oriented, in the upper and lower layers of the composite or by forming prism shaped openings continuously with the upper and lower plastic layers.

The manufacturing of the polarizing device shown in Figure 17 may be effected by compositing plastic strips as discussed hereinbefore or the unit may be more rapidly manufactured by extrusion. The die opening employed for this extrusion should contain suitably positioned parallel cores for effecting the spacing of the strips. To maintain the spacing between the strips against collapse the cores may be hollow and a gas or liquid under pressure may be forced into these spaces to maintain the separation of the plastic strips during solidification. In this method the forward end of the extruded plastic is closed to hold the gas under pressure contained therein.

Alternatively the separation may be effected by extruding between the strips a material having an index of refraction that differs at least .2 from the index of refraction of the strip material. This separating material may be a solid such as a transparent resin or plastic generally or it may be liquid or semi-solid.

The material in the extruded state should solidify in an isotropic condition. Treatment by heat or by vapor solvent or the like may be employed to effect this isotropic condition and to eliminate strain.

As a useful article of manufacture I further provide a light bulb which has integrally associated with it the various optical elements including a polarizer necessary to provide glare free illumination. My bulb is characterized by a centrally positioned light source such as a concentrated filament, enclosing glass walls containing the necessary vacuum, said walls being preferably parabolically shaped and being provided with a depolarizing internally reflecting surface and a preferably flat bottom face comprising multiple layers of glass or other suitable material adapted to polarize light transmitted therethrough from the depolarizing reflecting side walls at a polarizing angle. To eliminate high intensity direct light from the filament, a blocking and/or reflecting element is positioned to intercept rays proceeding directly down from the filament before reflection and to further redirect this light to the side wall reflectors.

The polarizing plates are preferably of extremely thin glass and are preferably fused or welded to a downwardly extended lip at the outer rim of the bulb.

The central portion of the discs may be cut out to receive the protruding bottom of the shield reflector which may be integral with the bulb.

The thin polarizing plates may be in the form of thin blown glass layers positioned within the bulb.

The principles involved in this integral bulb for producing polarized light are the same as those described above in connection with the lamp shown in Figure 34.

The same general optical principles here involved may be employed for polarizing fixture attachments for drop lights and the like.

The many forms of polarizers and lighting devices that have been described generally with respect to the physical principles involved therein have been illustrated and described with regard to specific embodiments thereof for the sake of clarification. It is to be understood that the specific constructions set forth are merely by way of explanation of the broad principles of light polarization and glare-free illumination that are described herein. I intend, therefore, to be limited only by the appended claims.

This application is a continuation-in-part of my co-pending application Serial No. 755,557, filed December 1, 1934.

I claim:

1. A device for providing divergent glare-free illumination comprising a concave reflector, a light source positioned substantially in the axis of the reflector to direct light on to the concave surface of the reflector, a polarizing element consisting of successive layers having abruptly different indices of refraction, the concave reflector being so formed and positioned as to direct substantially all the usable light onto said polarizing element at an angle of from 20° to 70° with respect to the surface of the polarizing element, the layers of the polarizing element being positioned substantially normal to the axis of the concave reflector.

2. A device for providing divergent glare-free illumination comprising a concave reflector, a light source positioned substantially in the axis of the reflector to direct light on to the concave surface of the reflector, a reflector shield beneath the light source, said reflector shield being positioned to direct light from said light source onto said concave reflector, a polarizing element consisting of successive layers having abruptly different indices of refraction, the concave reflector being so formed and positioned as to direct substantially all of the usable light onto said polarizing element at an angle of from 20° to 70° with respect to the surface of the polarizing element, the layers of the polarizing element being positioned substantially normal to the axis of the concave reflector.

3. A device for providing divergent glare-free illumination onto a body surface comprising a concave reflector, a light source positioned substantially in the axis of the reflector to direct light on to the concave surface of the reflector, a polarizing element consisting of successive layers having abruptly different indices of refraction, the concave reflector being so formed and positioned as to direct substantially all the usable light onto said polarizing element at an angle of from 20° to 70° with respect to the surface of the polarizing element, the layers of the polarizing element being positioned substantially normal to the axis of the concave reflector, and supporting means for said device positioned to direct polarized light travelling through the polarizing element onto said body surface at an angle of from 20° to 70° thereto, substantially every ray of usable light being polarized in a plane normal to its plane of incidence upon the body surface.

4. A device for providing divergent glare-free illumination for a body surface comprising a concave reflector, a light source positioned substantially in the axis of the reflector to direct light on to the concave surface of the reflector, a polarizing element consisting of successive layers having abruptly different indices of refraction, the concave reflector being so formed and positioned as to direct substantially all the usable light onto said polarizing element at an angle of about 33° with respect to the surface of the polarizing element, the layers of the polarizing element being positioned substantially normal to the axis of the concave reflector, means for supporting said reflector and polarizing element over said body surface, said supporting means being so positioned that substantially all usable light is directed onto said body surface at an angle of substantially 33° thereto, substantially every ray of usable light from said light source being polarized by said polarizing element in a plane normal to its plane of incidence upon the body surface.

5. A device for providing divergent glare-free illumination for a body surface comprising a light source, an internal reflector comprising a multiplicity of areas positioned to reflect light from said light source in a multiplicity of divergent directions, a polarizing element consisting of successive layers having abruptly different indices of refraction, the reflector being so formed and positioned as to direct substantially all the usable light onto said polarizing element at an angle of from 20° to 70° with respect to the surface of the polarizing element, the layers of the polarizing element being positioned substantially normal to the axis of the reflector, and a supporting means for said device positioned to direct polarized light travelling through the polarizing element onto said body surface at an angle of from 20° to 70° thereto, substantially every ray of usable light being polarized in a plane normal to its plane of incidence upon the body surface.

6. In an illuminating device for an extended body surface that is to be illuminated: a light source located at a distance from said body surface; a light reflector having a reflecting surface arranged to reflect rays of light from said light source toward said body surface; substantially planular light polarizing means consisting of a plurality of successive layers of light transmitting substance extending across the path of the light rays reflected by said reflecting surface toward said body surface and positioned so as to polarize and transmit the reflected light rays to said body surface, successive layers of said polarizing means having abruptly different indices of refraction; a support for holding said reflector and said polarizing means in predetermined position with respect to said body surface; said reflecting surface being so shaped and positioned and the layers of said polarizing means being so positioned with respect to the body surface and the light source that the rays of substantially all usable light of the light source are reflected by the reflecting surface onto said polarizing means at an angle of from 20° to 70° with respect to the facing surface of the polarizing means and that the light rays transmitted through the polarizing means are directed onto said body surface at an angle of from 20° to 70° with respect to that body surface; the rays of substantially all the usable light being polarized thereby in a plane normal to the plane of incidence of said light rays upon the body surface, said support positioning said polarizing means substantially parallel to said body surface so that said polarized light is directed onto said body surface at an angle of 20° to 70° with respect to said body surface so as to illuminate said body surface with glare-free light.

7. In an illuminating device for an extended body surface that is to be illuminated: a light source located at a distance from said body surface; a light reflector having a reflecting surface arranged to reflect rays of light from said light source toward said body surface; substantially planular light polarizing means consisting of a plurality of successive layers of light transmitting substance extending across the path of light rays reflected by said reflecting surface toward said body surface and positioned so as to polarize and transmit the reflected light rays to said body surface, successive layers of said polarizing means having abruptly different indices of refraction; a support for holding said reflector and said polarizing means in predetermined position with respect to said body surface; said reflecting surface being so shaped and positioned and the layers of said polarizing means being so positioned with respect to the body surface and the light source that the rays of substantially all usable light of the light source are reflected by the reflecting surface onto said polarizing means at an angle of substantially 33° with respect to the facing surface of the polarizing means and that the light rays transmitted through the polarizing means are directed onto said body surface at an angle of substantially 33° with respect to that body surface; the rays of substantially all usable light being polarized thereby in a plane normal to the plane of incidence of said light rays upon the body surface, said support positioning said polarizing means substantially parallel to said body surface so that said polarized light is directed onto said body surface at an angle of substantially 33° with respect to said body surface so as to illuminate said body surface with glare-free light.

8. In an illuminating device for an extended body surface that is to be illuminated: a light source located at a distance from said body surface; an internal light reflector comprising a multiplicity of areas positioned to reflect light from said light source in a multiplicity of directions; said reflecting areas being arranged to reflect rays of light from said light source toward said body surface; substantially planular light polarizing means consisting of a plurality of successive layers of light transmitting substance extending across the path of light rays reflected by said reflecting surface toward said body surface and positioned so as to polarize and transmit the reflected light rays to said body surface, successive layers of said polarizing means having abruptly different indices of refraction; said polarizing means substantially enclosing the opening of said reflector through which said light rays are reflected; a support for holding said reflector and said polarizing means in predetermined positions with respect to said body surface; said reflecting surface being so shaped and positioned and the layers of said polarizing means being so positioned with respect to the body surface and the light source that the rays of substantially all usable light of the light source are reflected by the reflecting surface onto said polarizing means at an angle of from 20° to 70° with respect to the facing surface of the polarizing means and that the light rays transmitted through the polarizing means are directed onto said body surface at an angle of from 20° to 70° with respect to that body surface; the rays of substantially all the usable light being polarized thereby in a plane normal to the plane of incidence of said light rays upon the body surface, said support positioning said polarizing means substantially parallel to said body surface so that said polarized light is directed onto said body surface at an angle of 20° to 70° with respect to said body surface.

9. In an illuminating device for an extended body surface that is to be illuminated; a light source located at a distance from said body surface; an internal light reflector comprising a multiplicity of areas positioned to reflect light from said light source in a multiplicity of directions, said reflecting areas being arranged to reflect rays of light from said light source toward said body surface; substantially planular light polarizing means consisting of a plurality of successive layers of light transmitting substance extending across the path of light rays reflected by said reflecting surface toward said body surface so as to polarize and transmit the reflected light rays to said body surface, successive layers of said polarizing means having abruptly different indices of refraction; said polarizing means substantially enclosing the opening of said reflector through which said light rays are reflected; a support for holding said reflector and said polarizing means in predetermined positions with respect to said body surface; said reflecting surface being so shaped and positioned and the layers of said polarizing means being so positioned with respect to the body surface and the light source that the rays of substantially all usable light of the light source are reflected by the reflecting surface onto said polarizing means at an angle of substantially 33° with respect to the facing surface of the polarizing means and that the light rays transmitted through the polarizing means are directed onto said body surface at an angle of substantially 33° with respect to that body surface; the rays of substantially all the usable light being polarized thereby in a plane normal to the plane of incidence of said light rays upon the body surface, said support positioning said polarizing means substantially parallel to said body surface so that said polarized light is directed onto said body surface at an angle of substantially 33° with respect to said body surface.

10. In an illuminating device for an extended body surface that is to be illuminated: a light source located at a distance from said body surface; a light reflector having a reflecting surface arranged to reflect rays of light from said light source toward said body surface; a light polarizing element consisting of a plurality of successive layers of light transmitting substance extending across the path of light rays reflected by said reflecting surface toward said body surface so as to polarize and transmit the reflected light rays to said body surface, successive layers of said polarizing element having abruptly different indices of refraction; a reflecting shield positioned beneath said light source for substantially shielding said polarizing element from said light source and for directing substantially all downwardly directed light from said light source onto the reflecting surface of said reflector at a predetermined angle; a support for holding said reflector and said polarizing element in predetermined positions with respect to said body surface; said reflecting surface being so shaped and positioned and the layers of said polarizing element being so positioned with respect to the body surface and the light source that the rays of substantially all usable light of the light source are reflected by the reflecting surface onto said polarizing element at an angle of from 20° to 70° with respect to the facing surface of the polarizing element, and that the light rays transmitted through the polarizing element are directed onto said body surface at an angle of from 20° to 70° with respect to that body surface; the rays of substantially all the usable light being polarized thereby in a plane normal to the plane of incidence of said light rays upon the body surface so as to illuminate said body surface with glare-free light.

11. An apparatus for obtaining a high quantitative conversion of unpolarized light to plane polarized light which comprises a polarizing means comprising successive layers having abruptly different indices of refraction, a reflector having a depolarizing surface, a light source positioned to supply light to said polarizing means at an angle of from 20° to 70° to the surface thereof, said polarizing means transmitting and polarizing one component of said light and reflecting a second component of said light to the depolarizing surface of said reflector, said depolarizing reflector depolarizing said second component and being positioned to redirect said resulting unpolarized beam of light on to said polarizing means at an angle of 20° to 70° to the surface of the polarizing means.

12. An apparatus for obtaining a high quantitative conversion of unpolarized light to plane polarized light which comprises polarizing means adapted to transmit and polarize one component of the light directed thereon and reflect and polarize a second component of the light directed thereon, a reflector having a depolarizing surface, a light source positioned to supply light to said polarizing means, said polarizing means transmitting and polarizing one component of said light and polarizing and reflecting a second component of said light to the depolarizing surface of said reflector, said depolarizing reflector depolarizing said second polarized component and being positioned to redirect said resulting unpolarized beam of light onto said polarizing means.

13. A device for providing divergent glare-free illumination comprising a concave reflector, said reflector having a depolarizing reflecting surface, a light source positioned substantially in the axis of the reflector to direct light on to the concave surface of the reflector, a polarizing element consisting of successive layers having abruptly different indices of refraction, the concave reflector being so formed and positioned as to direct substantially all the usable light onto said polarizing element at an angle of from 20° to 70° with respect to the surface of the polarizing element, the layers of the polarizing element being positioned substantially normal to the axis of the concave reflector.

14. In an illuminating device for an extended body surface that is to be illuminated: a light source located at a distance from said body surface; a light reflector having a reflecting surface arranged to reflect rays of light from said light source toward said body surface; a reflecting and depolarizing surface adapted to reflect and depolarize light directed thereon; a light polarizing element consisting of a plurality of successive layers of light transmitting substance extending across the path of light rays reflected by said reflecting surface toward said body surface so as to polarize and transmit the reflected light rays to said body surface, successive layers of said polarizing element having abruptly different indices of refraction; a support for holding said reflector and said polarizing element in predetermined position with respect to said body surface; said reflecting surface being so shaped and positioned and the layers of said polarizing element being so positioned with respect to the body surface and the light source that the rays of substantially all usable light of the light source are reflected by the reflecting surface onto said polarizing element at an angle of from 20° to 70° with respect to the facing surface of the polarizing element and that the light rays transmitted through the polarizing element are directed onto said body surface at an angle of from 20° to 70° with respect to that body surface; the rays of substantially all the usable light being polarizing thereby in a plane normal to the plane of incidence of said light rays upon the body surface, said support positioning said polarizing element substantially parallel to said body surface so that said polarized light is directed onto said body surface at an angle of 20° to 70° with respect to said body surface so as to illuminate said body surface with glare-free light.

ALVIN M. MARKS.